US008982397B2

(12) United States Patent
Shinosaki et al.

(10) Patent No.: US 8,982,397 B2
(45) Date of Patent: Mar. 17, 2015

(54) IMAGE PROCESSING DEVICE, NON-TRANSITORY COMPUTER READABLE RECORDING MEDIUM AND OPERATIONAL EVENT DETERMINING METHOD

(71) Applicant: Konica Minolta, Inc., Chiyoda-ku (JP)

(72) Inventors: Yusuke Shinosaki, Toyokawa (JP); Shinichi Asai, Gamagori (JP); Takao Kurohata, Hino (JP); Kentaro Nagatani, Toyokawa (JP); Junichi Isamikawa, Toyokawa (JP); Yoichi Kurumasa, Toyokawa (JP)

(73) Assignee: Konica Minolta, Inc., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/051,803

(22) Filed: Oct. 11, 2013

(65) Prior Publication Data

US 2014/0104648 A1    Apr. 17, 2014

(30) Foreign Application Priority Data

Oct. 11, 2012    (JP) ................................. 2012-225585

(51) Int. Cl.
*H04N 1/00*    (2006.01)

(52) U.S. Cl.
CPC ................................. H04N 1/00352 (2013.01)
USPC .......................... 358/1.15; 358/1.13; 358/1.14

(58) Field of Classification Search
USPC ............... 358/1.13, 1.14, 1.15; 715/784, 810; 345/173
See application file for complete search history.

(56) References Cited

U.S. PATENT DOCUMENTS

| 5,481,278 A | 1/1996 | Shigematsu et al. |
|---|---|---|
| 7,840,912 B2 | 11/2010 | Elias et al. |
| 2009/0228901 A1 | 9/2009 | Beaver et al. |
| 2010/0125786 A1* | 5/2010 | Ozawa et al. .................. 715/702 |
| 2012/0044173 A1 | 2/2012 | Homma et al. |

(Continued)

FOREIGN PATENT DOCUMENTS

| JP | 06-131110 A | 5/1994 |
|---|---|---|
| JP | 2008-059342 A | 3/2008 |

(Continued)

OTHER PUBLICATIONS

Office Action (Decision to Grant a Patent) issued on Oct. 28, 2014, by the Japan Patent Office in corresponding Japanese Patent Application No. 2012-225585, and an English Translation of the Office Action. (6 pages).

*Primary Examiner* — Allen H Nguyen
(74) *Attorney, Agent, or Firm* — Buchanan Ingersoll & Rooney PC

(57) ABSTRACT

An image processing device comprises: a display part on which various types of screens are displayed; a manipulation detecting part for detecting an input by a user on the screen; a grouping part for classifying multiple screen parts contained in the screen into a group as a closed region by the screen part that is capable of receiving the same event and associating the same event with the group as the common event in the group; an event determining part for identifying the closed region where the user's input is detected and running only an operational event determining routine corresponding to the event associated with the group of the identified closed region of a plurality of operational event determining routines when the input is detected, thereby specifying the event corresponding to the user's input; and a controlling part for controlling operations based on the specified event.

14 Claims, 22 Drawing Sheets

(56) References Cited

U.S. PATENT DOCUMENTS

2012/0099130 A1* 4/2012 Tohki et al. ............ 358/1.13
2012/0242599 A1* 9/2012 Seo et al. ............... 345/173
2013/0111397 A1* 5/2013 Miyoshi et al. ......... 715/784

FOREIGN PATENT DOCUMENTS

| | | |
|---|---|---|
| JP | 2009-0525538 A | 7/2009 |
| JP | 2009-211704 A | 9/2009 |
| JP | 2012-043266 A | 3/2012 |

* cited by examiner

FIG. 7

| SCREEN | REGION | SINGLE TAP | DOUBLE TAP | LONG TAP | DRAG | FLICK | PINCH | ROTATION |
|---|---|---|---|---|---|---|---|---|
| A | R1 | ○ | ○ | ○ | ○ | ○ | | |
| A | R2 | ○ | | | ○ | | | |
| B | R3 | | ○ | | ○ | | ○ | ○ |
| B | R4 | ○ | | | ○ | | | |
| C | R5 | ○ | ○ | ○ | ○ | ○ | | |
| C | R6 | ○ | | | ○ | | | |
| C | R7 | ○ | | | | | | |
| D | R8 | ○ | | | ○ | ○ | | |
| D | R9 | ○ | | | ○ | | | |

RECEIVABLE EVENT

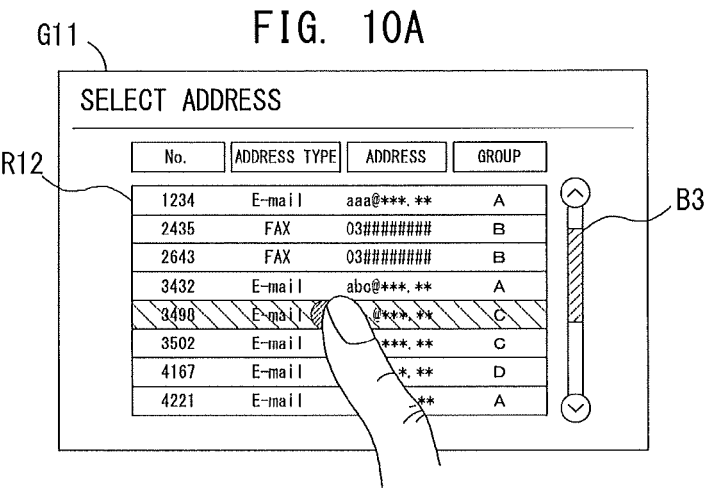
FIG. 10A
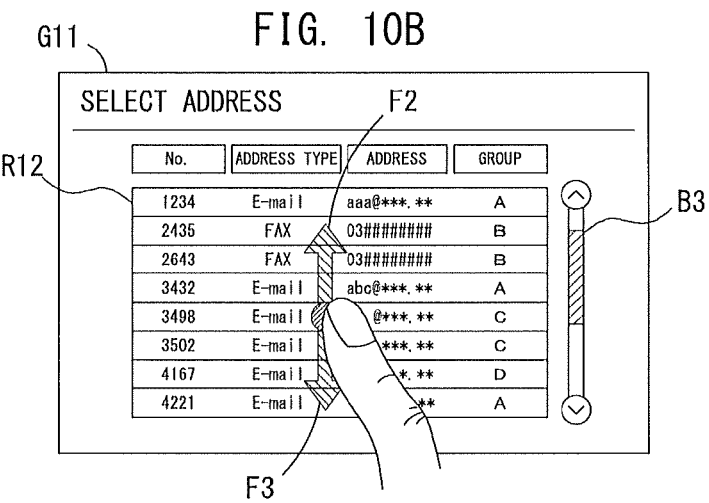
FIG. 10B
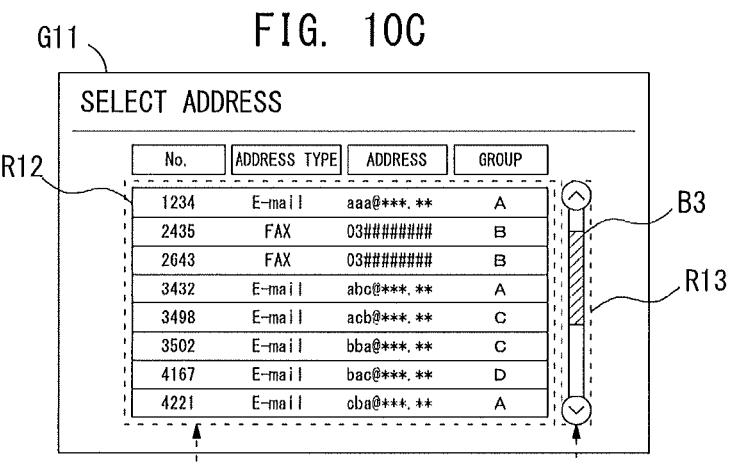
FIG. 10C
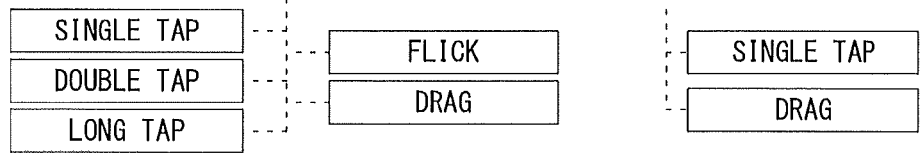

GROUPING

IMAGE PROCESSING DEVICE, NON-TRANSITORY COMPUTER READABLE RECORDING MEDIUM AND OPERATIONAL EVENT DETERMINING METHOD

This application is based on the application No. 2012-225585 filed in Japan, the contents of which are hereby incorporated by reference.

BACKGROUND OF THE INVENTION

1. Field of the Invention

The present invention relates to an image processing device, a non-transitory computer readable recording medium and an operational event determining method.

2. Description of the Background Art

Conventional display devices such as smart phones or tablet terminals are capable of detecting complicated gestures input by users, for example, single touch gestures or multi-touch gestures. This known technique is introduced for example in Japanese Patent Application Laid-Open No. JP 2009-525538 A (hereafter, document 1) and Japanese Patent Application Laid-Open No. JP 2009-211704 A (hereafter, document 2). According to the known technique disclosed in document 1, for example, a gesture set is defined in a multi-touch sensing area of the display device. In response to detecting the operation with the multi-touch sensing area, the device specifies one or more gestures event included in the gesture set. According to the known technique disclosed in document 2, for example, a multi-touch flag is added on a region of the display device in advance so that the users are allowed to operate the region with multi-touch gestures.

Recently, image processing devices called as network printers or MFPs (Multi-functional peripherals) having a feature of detecting complicated gestures input by users and allowing the users to configure settings relating to jobs have gradually come into use. The users input a variety of gestures; single tapping, double tapping, long tapping, flicking, dragging, pinching in, pinching out, etc., thereby configuring the settings relating to the jobs or checking image data efficiently.

The aforementioned image processing device is required to precisely detect the gestures input by the user. A plurality of operational event determining routines for each event which is a target of detection such as single tapping, double tapping, long tapping, flicking, dragging, pinching in and pinching out are installed in advance on the image processing device. In response to detecting the input by the user on an operational panel, the image processing device runs each of the plurality of operational event determining routines one after the other, thereby specifying the event corresponding to the input by the user and performing processing corresponding to the specified event.

Various types of screens are displayed on the operational panel of the image processing device. The gestures that the user is allowed to input on each screen are different. Also, a region that only allowing the user to single tap and a region allowing the user to flick or drag to scroll may be contained in one screen, for example. In this case, the gesture that may be input by the user differs depending on the region. More specifically, processing corresponding to a certain event such as processing corresponding to flicking or pinching is not defined in some screen parts in the screens displayed on the operational panel.

When detecting the input by the user, the aforementioned conventional image processing device runs all the plurality of operational event determining routines one after the other. So, even when detecting the input on the screen in which the processing corresponding to flicking is not defined, the image processing device runs the operational event determining routine to detect flicking. The conventional image processing device executes unnecessary operational event determining routine for some screens displayed on the operational panel, so the resource of a CPU and so on is occupied.

Especially this type of image processing devices are allowed to receive input by the user even during execution of a job such as a scan job, a copy job, a print job or a data transmitting and receiving job. When input by the user is detected during execution of the job, the image processing device runs every operational event determining routine one after the other in conjunction with execution of the job in order to specify the event corresponding to the detected input. It is assumed, for example, the screen in which the processing corresponding to flicking is not defined is displayed during execution of the job. Even in such a case, if the user inputs flicking as an erroneous operation, the CPU runs every operational event determining routine one after the other in the background of execution of the job and specifies that the event input by the user is flicking. The processing corresponding to flicking is not defined in the screen, so even when the CPU is allowed to specify that the event is flicking, it does not perform any special following processing.

The input by the user during execution of the job may not be erroneous operation. Even in such a case, every operational event determining routine is run one after the other in response to detecting the input by the user. The operational event corresponding to the user's input is then not allowed to be specified efficiently, and the occupancy of the CPU is increased more than necessary.

As described above, every operational event determining routine is run in response to detecting user's input. On the image processing device with this configuration, when image data containing data of a plurality of pages or high-resolution image data needs to be processed during execution of the job, the image processing delays because the CPU executes unnecessary operational event determining routine, resulting in low productivity of the image processing device.

SUMMARY OF THE INVENTION

The present invention is intended to solve the above problems. Thus, the present invention is intended to provide an image processing device, a non-transitory computer readable recording medium and an operational event determining method capable of efficiently specifying an event corresponding to an input by a user by running only a necessary operational event determining routine in response to a region where the input is detected without running every operational event determining routine one after the other when detecting input by the user.

First, the present invention is directed to an image processing device.

According to an aspect of the image processing device, the image processing device comprises: a display part on which various types of screens are displayed; a manipulation detecting part for detecting an input by a user on the screen of said display part; a grouping part for classifying multiple screen parts contained in the screen displayed on said display part into a group as a closed region by the screen part that is capable of receiving the same event and associating the same event with said group as the common event in said group; an event determining part for identifying the closed region where the user's input is detected among from at least one closed region classified by said grouping part and running only an operational event determining routine corresponding to the event associated with the group of the identified closed region of a plurality of operational event determining routines when the input is detected by said manipulation detecting part, thereby specifying the event corresponding to the user's input; and a controlling part for controlling operations based on the event specified by said event determining part.

Second, the present invention is directed to a non-transitory computer readable recording medium on which a program is recorded. The program is executable on a computer including a display part on which various types of screens are displayed and a manipulation detecting part for detecting an input by a user on the screen of the display part.

According to an aspect of the non-transitory computer readable recording medium, the program is executed on the computer to function as a system comprising: a grouping part for classifying multiple screen parts contained in the screen displayed on said display part into a group as a closed region by the screen part that is capable of receiving the same event and associating the same event with said group as the common event in said group; an event determining part for identifying the closed region where the user's input is detected among from at least one closed region classified by said grouping part and running only an operational event determining routine corresponding to the event associated with the group of the identified closed region of a plurality of operational event determining routines when the input is detected by said manipulation detecting part, thereby specifying the event corresponding to the user's input; and a controlling part for controlling operations based on the event specified by said event determining part.

Third, the present invention is directed to an operational event determining method for determining an event corresponding to an input by a user with a display part on which various types of screens are displayed based on the user's input.

According to an aspect of the operational event determining method, the operational event determining method comprises the steps of: (a) classifying multiple screen parts contained in the screen displayed on said display part into a group as a closed region by the screen part that is capable of receiving the same event and associating the same event with said group as the common event in said group; (b) detecting the input by the user with one of the screens being displayed on said display part; and (c) identifying the closed region where the user's input is detected among from at least one closed region classified by said grouping part and running only an operational event determining routine corresponding to the event associated with the group of the identified closed region of the plurality of operational event determining routines when the input is detected by said manipulation detecting part, thereby specifying the event corresponding to the user's input.

BRIEF DESCRIPTION OF THE DRAWINGS

FIG. 7 shows an example when a common event is associated with the respective regions formed by grouping each of multiple screens;

FIGS. 10A, 10B and 10C show an example of an address selecting screen on which multiple pieces of address information is shown in a list form;

DESCRIPTION OF THE PRESENT PREFERRED EMBODIMENTS

Figure 1:
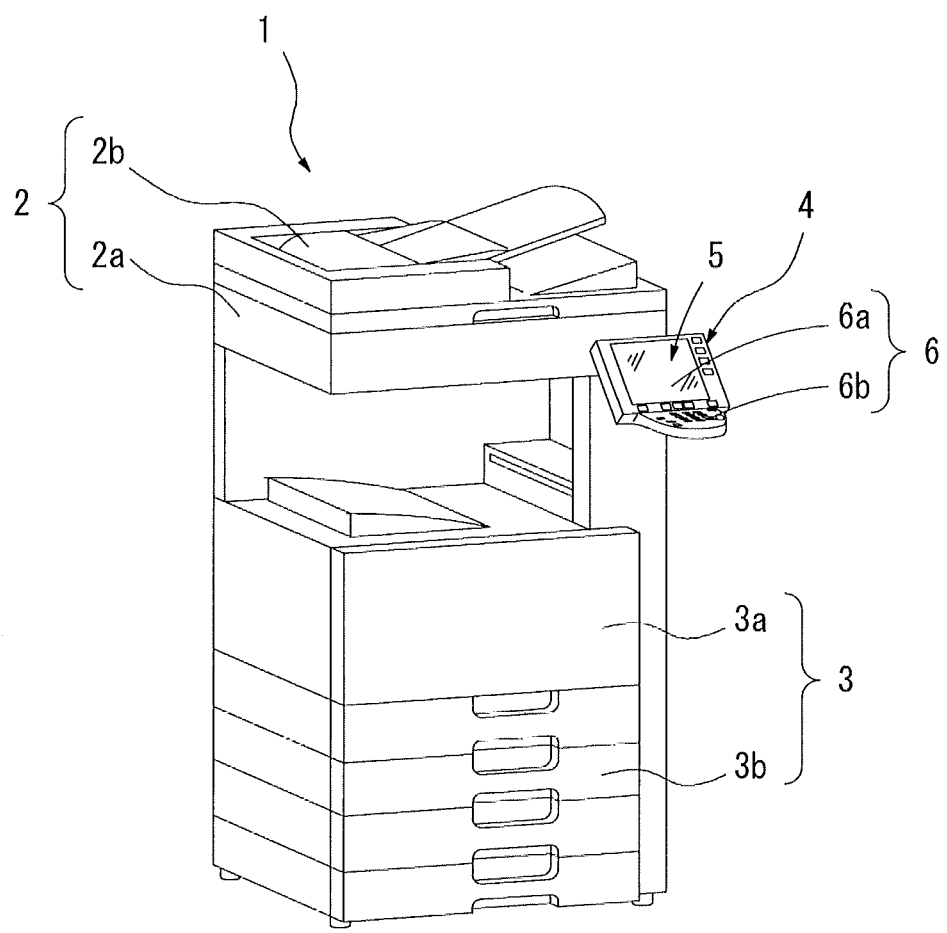
FIG. 1 shows an exemplary outline configuration of an image processing device.

A preferred embodiment of the present invention is described in detail below with reference to figures. In the description given below, those elements which are shared in common among figures are represented by the same reference numerals, and these elements are not discussed repeatedly for the same description.

FIG. 1 shows an exemplary outline configuration of an image processing device 1 of the present preferred embodiment. The image processing device 1 is formed from one of MFPs (Multi-functional peripherals) and includes a variety of functions such as a scan function, a print function, a copy function, a fax function, a network function and an email transmitting and receiving function. The image processing device 1 executes a job designated by a user. The image processing device 1 includes a scanner section 2 on the upper side of its device body. The scanner section 2 is driven in response to the scan job. The scanner section 2 includes an image reading part 2a that optically reads images of a document and a document feeding part 2b that automatically feeds each page of the document to the image reading part 2a. The scanner section 2 reads each page of the document placed by the user and generates image data of the read pages. The image processing device 1 also includes a printer section 3 on the lower central part of its device body. The printer section 3 is driven in response to executing the print job. The printer section 3 includes an image forming part 3a that forms images by a method such as an electrophotographic method based on the input image data and outputs and a paper feeding part 3b that feeds sheet materials such as printing papers one by one to the image forming part 3a. The printer section 3 produces a printed output based on the image data specified by the user.

The image processing device 1 is provided with an operational panel 4, a user interface operable by the user in use of the image processing device 1, on its front side. The operational panel 4 includes a display unit 5 on which a variety of information is displayed to the user and a manipulation unit 6 through which the user gives an input. The display unit 5 formed from a liquid-crystal color display in a predetermined screen size, for instance, is capable of displaying a variety of images. The manipulation unit 6 is formed from a touch sensor 6a arranged on the screen of the display unit 5 and a plurality of push-button operational keys 6b arranged around the screen of the display unit 5. The user gives various types of inputs to the manipulation unit 6 with viewing the screen displayed on the display unit 5, thereby configuring settings for execution of the job or giving instructions on execution of the job to the image processing device 1.

The touch sensor 6a arranged on the screen of the display unit 5 is capable of detecting not only single touch gestures but also multi-touch gestures input by the user. The user is allowed to input single touch gestures by touching one point on the screen of the display unit 5, and single touch gestures include, for instance, single tapping, double tapping, long tapping, flicking and dragging. The user is allowed to input multi-touch gestures by touching multiple points on the screen of the display unit 5 simultaneously, and multi-touch gestures include pinching such as pinching in and pinching out and rotation, for instance. In response to being tapped at least one point on the screen of the display unit 5, the touch sensor 6a is allowed to identify the position where the user tapped (hereafter, tapped position) and to detect the release operation from the tapped state or moving in any direction of the tapped position after identifying the tapped position. Thus, the user is allowed to configure settings relating to the job by inputting the variety of gestures on the screen of the display unit 5.

The push-button operational keys 6b arranged around the screen of the display unit 5 are formed from keys such as a numeric keypad featuring digits 0 to 9 keys. The push-button operational keys 6h detects only pressing operation by the user.

Figure 2:
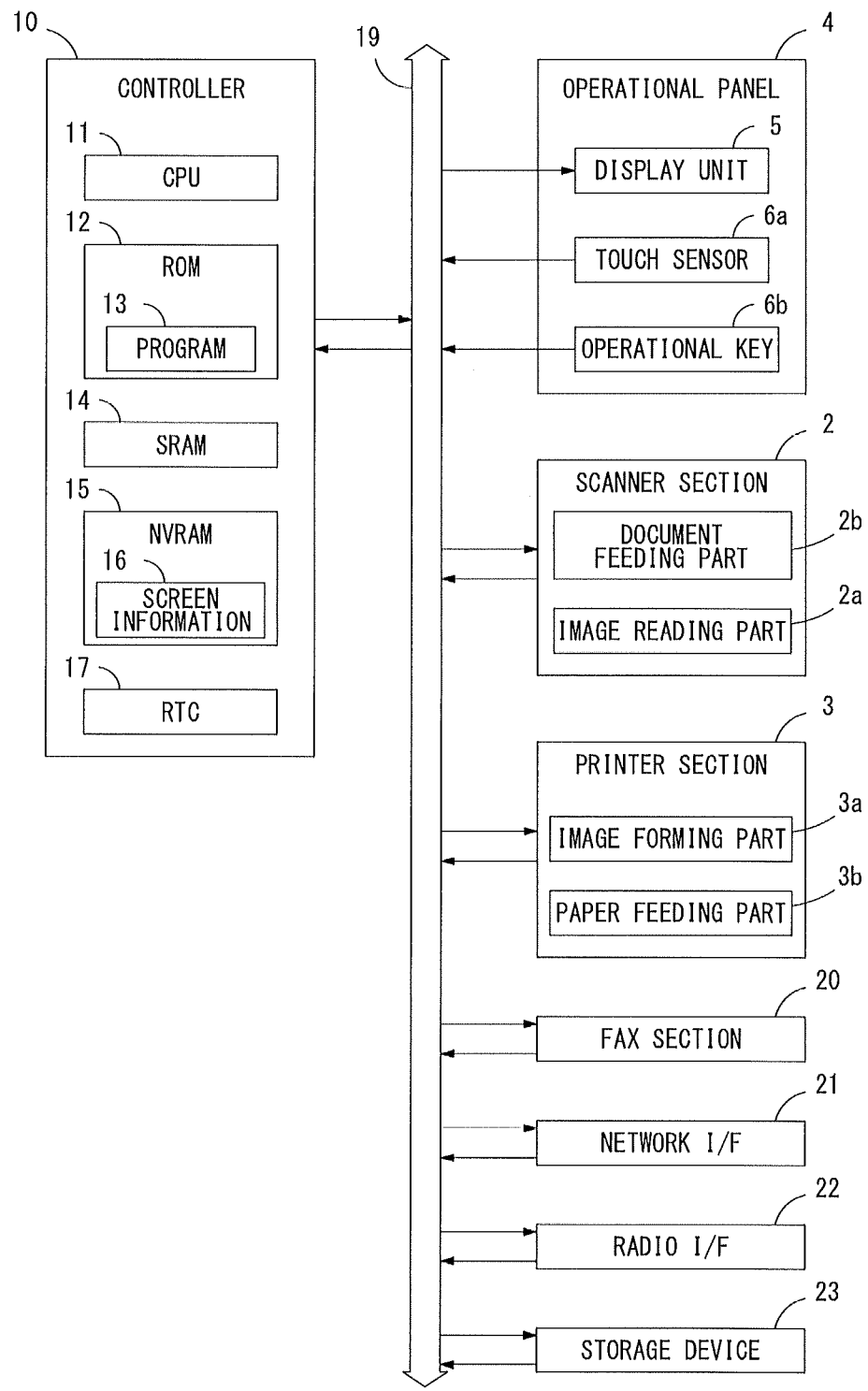
FIG. 2 is a block diagram showing an exemplary hardware configuration of the image processing device.

FIG. 2 is a block diagram showing an exemplary hardware configuration of the image processing device 1. As illustrated in FIG. 2, the image processing device 1 includes a controller 10, a fax section 20, a network interface 21, a radio interface 22 and a storage device 23 besides the aforementioned scanner section 2, printer section 3, and operational panel 4. These parts are allowed to transmit and receive data with each other via a data bus 19.

The controller 10 controls overall operations of each operational panel 4, scanner section 2, printer section 3, fax section 20, network interface 21, radio interface 22 and storage device 23 as shown in FIG. 2. The fax section 20 transmits and receives fax data over public phone lines not shown in figures. The network interface 21 is for connecting the image processing device 1 to a network such as LAN (Local Area Network). The radio interface 22 is for establishing radio communication with NFC (Near Field Communication) with an external device. The storage device 23 is a nonvolatile storage part formed from a device such as a hard disk drive (HDD) or a solid state drive (SSD), for instance, to temporarily store therein image data received over the network or image data generated by the scanner section 2.

As illustrated in FIG. 2, the controller 10 includes a CPU 11, a ROM 12, a SRAM 14, a NVRAM 15 and a RTC 17. After the image processing device 1 is powered on, the CPU 11 reads and executes a program 13 stored on the ROM 12. The controller 10 then starts controlling operations of each part as described above. Especially the CPU 11 is a main part that controls operations of the image processing device 1, and controls not only execution of the job but also operations of the operational panel 4 which serves as the user interface. To be more specific, the CPU 11 controls switching of the screens displayed on the display unit 5 of the operational panel 4. Also, when the touch sensor 6a or the operational keys 6b detect the user's input, the CPU 11 specifies the input corresponds to what event and controls operations in response to the specified event. The event is the operational event which is the input by the user, and includes multiple events such as single tapping, double tapping, long tapping, flicking, dragging, pinching and rotation as the events in response to the user's input performed on the touch sensor 6a, for example. When the CPU 11 controls operations in response to the specified event, it controls switching of the screens, starting execution of the job or terminating execution of the job, for example. The operations of the CPU 11 are described in detail later.

The SRAM 14 is a memory that provides a storage region for operations by the CPU 11. The SRAM 14 stores therein temporary data required in accordance with execution of the program 13 by the CPU 11.

The NVRAM 15 is a battery backup nonvolatile memory, and stores therein data including various types of setting values or information on the image processing device 1. Screen information 16 is stored on the NVRAM 15 in advance as show in FIG. 2. Information relating to multiple screens displayed on the display unit 5 of the operational panel 4 is stored as the screen information 16. The screen information 16 of each screen contains a variety of screen parts to receive the gestures by the user. Such screen parts include, for instance, operational keys operable by the user, a list region in which a variety of information is displayed in a list form, a thumbnail image region in which a thumbnail image is displayed and a preview region in which a preview image is displayed. Each of the screen parts is configured to be capable of receiving the different event. Also, the process that should be performed for the receivable event is set individually with each screen part. Based on combination of the screen parts, a screen structure of each screen is defined, and the screen structure allows the user to input a various types of gestures. Each of the multiple screens displayed on the display unit 5 has different screen structure. Thus, even when the user inputs the gestures on the touch sensor 6a, the event that can be received on each screen differs.

The RTC 17 is a real-time clock and is a clock circuit continues to count present time.

Figure 3:
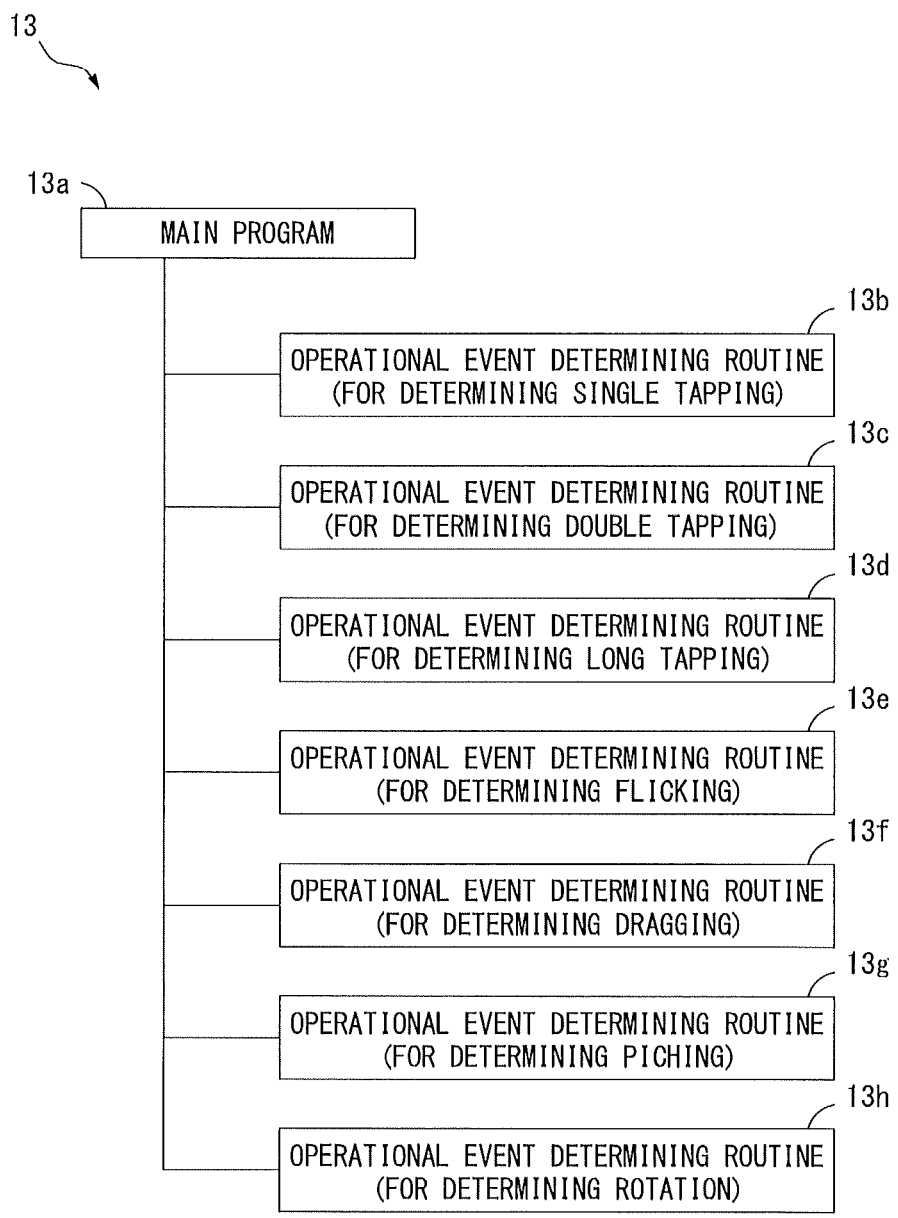
FIG. 3 shows an exemplary conceptual configuration of a program.

FIG. 3 shows an exemplary conceptual configuration of the program 13 executed by the CPU 11. The program 13 includes a main program 13a and a plurality of operational event determining routines 13b, 13c, 13d, 13e, 13f, 13g and 13h. The main program 13a is automatically read and executed by the CPU 11 when the image processing device 1 is powered on. The plurality of operational event determining routines 13b, 13c, 13d, 13e, 13f, 13g and 13h are provided in advance as sub routines for the main program 13a. The plurality of operational event determining routines 13b, 13c, 13d, 13e, 13f, 13g and 13h are the sub routines for specifying the user's input corresponds to which event, single tapping, double tapping, long tapping, flicking, dragging, pinching or rotation when the touch sensor 6a detects the input (gesture) by the user. Because the detail of the contents or the procedure of the determining processing is different for each event to specify, the operational event determining routine is provided in advance for each event. When the touch sensor 6a detects the input by the user, the CPU 11 of the present preferred embodiment runs only the necessary operational event determining routine of the plurality of operational event determining routines 13b, 13c, 13d, 13e, 13f, 13g and 13h, thereby specifying efficiently the event corresponds to the input. The detailed processing performed by the CPU 11 is explained next.

Figure 4:
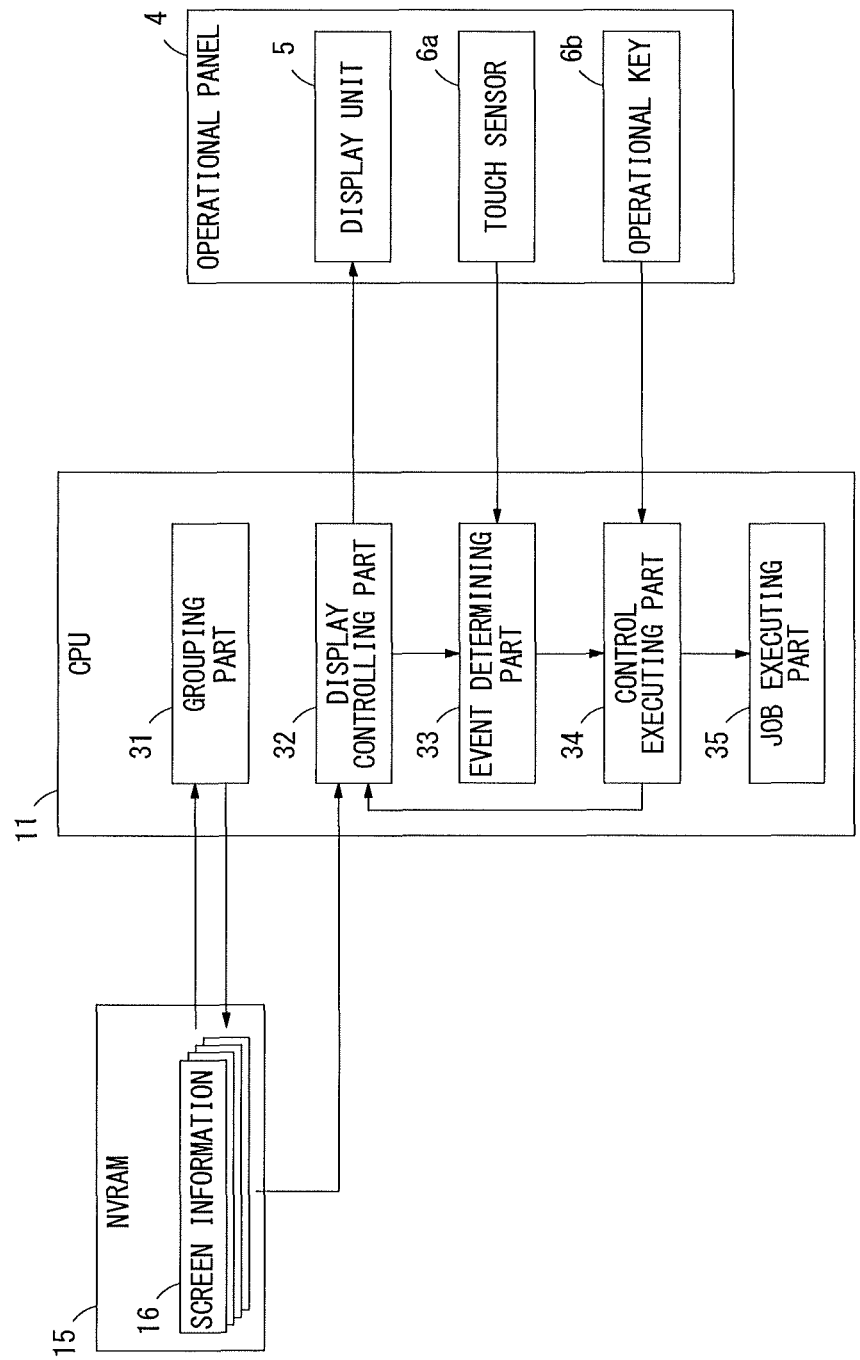
FIG. 4 is a block diagram showing an exemplary functional configuration realized when the CPU runs a main program.

FIG. 4 is a block diagram showing an exemplary functional configuration realized when the CPU 11 runs the main program 13a. As illustrated in FIG. 4, the CPU 11 executes the main program 13a, thereby serving as a grouping part 31, a display controlling part 32, an event determining part 33, a control executing part 34 and a job executing part 35.

The grouping part 31 classifies the multiple screen parts contained in the screen into at least one group according to the screens displayed on the display unit 5 and associates the event with each group. The grouping part 31 groups the screen parts that are capable of receiving the same event of the multiple screen parts contained in one of the screens together to form a closed region in the screen, thereby grouping more than one screen part into at least one closed region. To be more specific, the closed region formed in the screen includes one or more screen parts that are capable of receiving the same event. When more than one screen part that is capable of receiving different events is contained in one of the screens, the contained more than one screen part is classified into different closed regions and multiple groups are created in the screen. The grouping part 31 sets in advance the event that may be commonly received in the group corresponding to each group created by grouping the multiple screen parts contained in the screen. More in detail, the grouping part 31 associates the same event that may be received by the screen part included in the closed region with the whole part of the closed region as the common event according to the closed region formed as a result of grouping.

The grouping part 31 may perform the above-described processing based on instruction information received through the operational panel 4 or from outside via the network interface 21. In this case, the grouping part 31, based on the instruction information received through the operational panel 4 or from outside via the network interface 21, classifies each of the multiple screen parts contained in the respective screens into at least one group and associates the common event with each group. In this case, the user inputs the gestures on each screen or a designer who designs each screen is allowed to group the multiple screen parts by manual.

The grouping part 31 reads and analyzes the screen information 16 stored in the NVRAM 15, thereby specifying the event that may be received on each of the multiple screen parts contained in the respective screens and classifying into at least one group by the specified event. The grouping part 31 then may automatically perform the processing to associate the event that may be commonly received in the group with each group.

Figure 5:
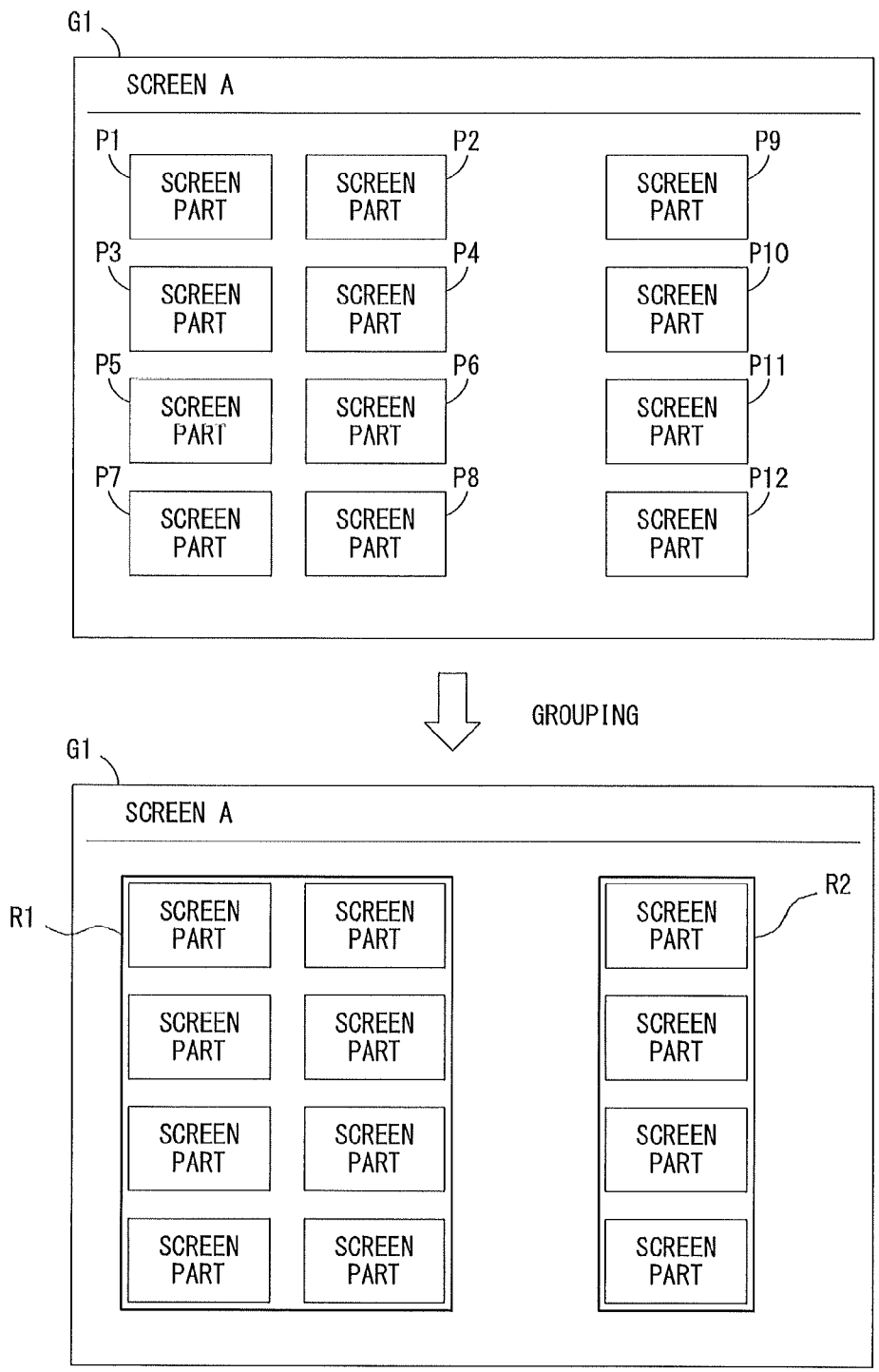
FIG. 5 shows one concept of a grouping processing by a grouping part.
Figure 6:
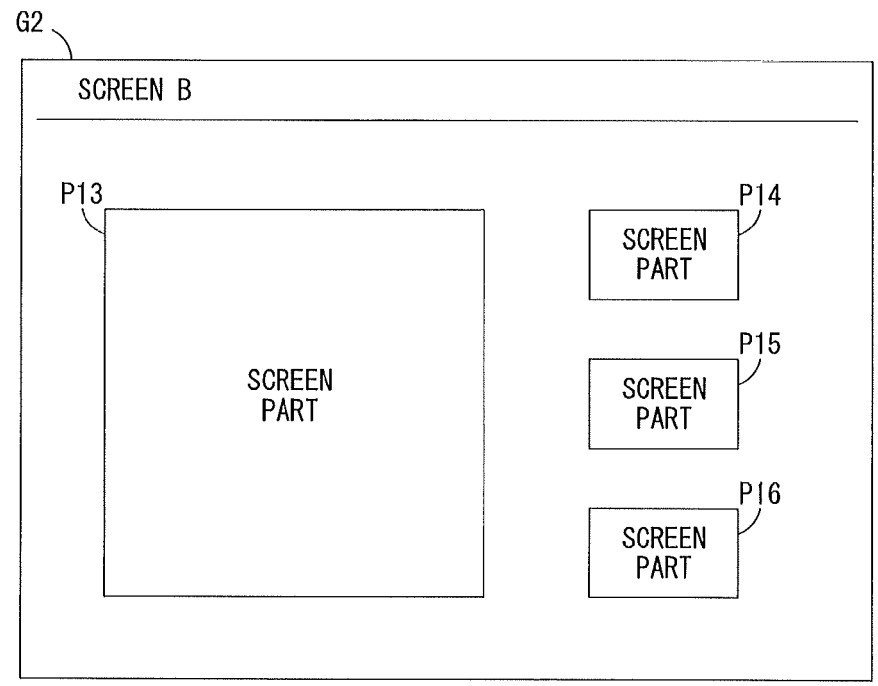
FIG. 6 shows another concept of a grouping processing by the grouping part.
Figure 6:
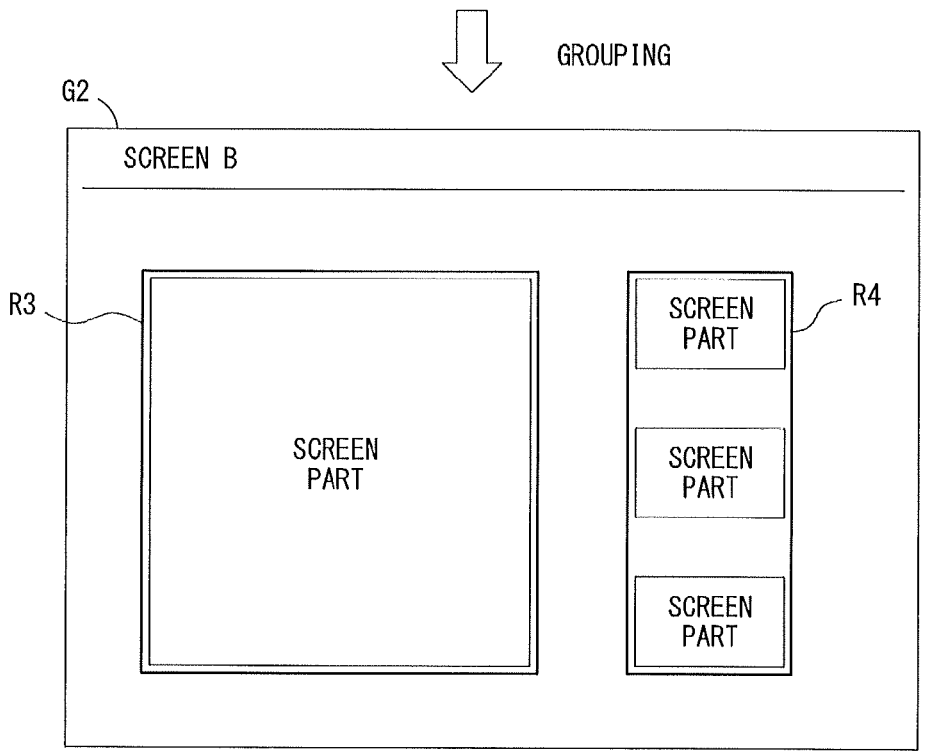

FIGS. 5 and 6 show a concept of a grouping processing by the grouping part 31. As illustrated in FIG. 5, a screen G1 displayed on the display unit 5 contains multiple screen parts P1 to P12 as an example. It is assumed that, for example, the screen parts P1 to P8 are operational keys that are capable of receiving single tapping, double tapping, long tapping, dragging and flicking and the screen parts P9 to P12 are operational keys that are capable of receiving single tapping and dragging. The screen parts P1 to P8 and the screen parts P9 to P12 are capable of receiving different events. In this case, the grouping part 31 classifies two or more screen parts that are capable of receiving the same event and located within the range of a predetermined distance in the screen G1 together to create a group, and associates the common event with the created group. When there is no other screen part that is capable of receiving the same event within the range of the predetermined distance, the screen part itself is classified into a group and the event that may be received on the screen part is associated with the group. In the example of FIG. 5, the grouping part 31 groups the screen parts P1 to P8 that are capable of receiving single tapping, double tapping, long tapping, dragging and flicking together and forms a closed region R1, and groups the screen parts P9 to P12 that are capable of receiving single tapping and dragging together and forms another closed region R2. Five events, single tapping, double tapping, long tapping, dragging and flicking, are associated with the group of the closed region R1 as the common event by the grouping part 31. Also, two events, single tapping and dragging, are associated with the group of the closed region R2 as the common event by the grouping part 31.

As illustrated in FIG. 6, a screen G2 displayed on the display unit 5 contains multiple screen parts P13 to P16 as an example. It is assumed, for example, the screen part P13 is a preview region that is capable of receiving double tapping, dragging, pinching and rotation and the screen parts P14 to P16 are scroll bars that are capable of receiving single tapping and dragging. The screen parts P13 and the screen parts P14 to P16 are capable of receiving different events. In this case, the grouping part 31 groups only the screen part P13 that is capable of receiving double tapping, dragging, pinching and rotation and forms a closed region R3, and groups the screen parts P14 to P16 that are capable of receiving single tapping and dragging together and forms another closed region R4. Four events, double tapping, dragging, pinching and rotation, are associated with the group of the closed region R3 as the common event by the grouping part 31. Also, two events, single tapping and dragging, are associated with the group of the closed region R4 as the common event by the grouping part 31.

FIG. 7 shows an example when the common event is associated with the respective regions formed by grouping each of the multiple screens displayed on the display unit 5. The grouping part 31 groups the multiple screen parts contained in each screen by the same event as described above, and each screen displayed on the display unit 5 is classified into one or more regions as illustrated in FIG. 7. As a result, the common event is associated with each region. In the example of FIG. 7, circle is marked for the event associated with each region.

In response to grouping as described above, the grouping part 31 groups the multiple screen parts contained in the screen by classifying each of the screen parts into any of the groups. The grouping part 31, for example, adds information relating to the closed region of each group and the common event associated with each group to the screen information 16 of the corresponding screen, thereby registering the result of grouping. The grouping part 31 associates at least one of the multiple events, single tapping, double tapping, long tapping, flicking, dragging, pinching and rotation with the group. When the group is capable of receiving all of those events, for example, the grouping part 31 associates all of the events as the common events with the group.

The information showing that the common event associated with the group by grouping the multiple screen parts contained in the screen may be added in advance when the screen information 16 is stored in the NVRAM 15 at shipping of the image processing device 1. The screen information 16 stored in the NVRAM 15 may be updated after the shipping of the image processing device 1 due to, for instance, addition of optional features, installation of new application programs or customization of screens. Once the screen information 16 is updated, the screen structure of the screen changes. In some cases, as a result of the change in the screen structure, the events that cannot be received on the screen before the update may be received after the update of the screen information 16. Thus, the grouping part 31 is brought into operation after the CPU 11 executes the main program 13a to analyze the screen structure of each screen during the startup processing of the image processing device 1, thereby classifying the multiple screen parts into at least one group and setting the event to detect in response to the user's input among from the multiple events by associating it with each group.

Referring back to FIG. 4, the display controlling part 32 reads the screen information 16 stored in the NVRAM 15 and selects one of the multiple screens, then outputting to the display unit 5, thereby displaying the selected screen on the display unit 5. After the image processing device 1 is started up, the display controlling part 32 selects an initial screen among from the multiple screens and displays the selected initial screen on the display unit 5. After that, the display controlling part 32 sequentially updates the screen on the display unit 5 in response to screen update instructions from the control executing part 34.

The event determining part 33 specifies the event corresponding to the user's input when the touch sensor 6a of the operational panel 4 detects the input (gesture) on the screen by the user. The event determining part 33 is one of functions realized by the main program 13a. After the touch sensor 6a detects the user's input, the event determining part 33 identifies the closed region where the user's input is detected of the closed regions formed in response to grouping the screen being displayed on the display unit 5 at detection of the user's input, and determines the event associated in advance with the identified closed region. The event determining part 33 runs only the operational event determining routine corresponding to the determined event, thereby specifying the event corresponding to the user's input.

To be more specific, in response to detecting the user's input on the screen, the event determining part 33 runs only the operational event determining routine corresponding to the event associated with the closed region where the user's input is detected of the plurality of operational event determining routines 13b, 13c, 13d, 13e, 13f, 13g and 13h to determine only the event that can be received on the screen. In this case, more than one event may be associated with the closed region where the user's input is detected, for example. It is assumed, for example, the closed region where the user's input is detected is capable of receiving three events, single tapping, double tapping and flicking. In such a case, the event determining part 33 runs the operational event determining routine corresponding to each event one after the other, thereby specifying the event corresponding to the user's input. As described above, when some kind of input performed by the user is detected by the touch sensor 6a, the event determining part 33 does not run all the operational event determining routines 13b, 13c, 13d, 13e, 13f, 13g and 13h every time the input is detected. The event determining part 33 runs only the operational event determining routine corresponding to the event which can be received on the closed region where the user's input is detected. As a result, the event corresponding to the user's input may be specified efficiently without running unnecessary determining routines.

After specifying the event corresponding to the user's input by running only the necessary operational event determining routine, the event determining part 33 outputs the specified event to the control executing part 34. The event determining part 33 sometimes is not able to specify the event corresponding to the user's input even by running only the necessary operational event determining routine as described above. It is assumed, for example, the user inputs the gesture, such as long tapping, dragging, pinching or rotation on the closed region which is capable of receiving, for instance, three events, single tapping, double tapping and flicking. In this case, the event determining part 33 is not allowed to specify the event corresponding to the user's input even by running the operational event determining routines 13b, 13c and 13e corresponding to the respective events, single tapping, double tapping and flicking. The event determining part 33 then does not output any information to the control executing part 34.

Even when running three operational event determining routines, for instance, one after the other, the event determining part 33 is sometimes allowed to specify the event corresponding to the user's input by running the first operational event determining routine. In such a case, the event determining part 33 does not run other following operational event determining routines, and outputs the specified event to the control executing part 34. It is the same when the event is specified by miming the second operational event determining routine. More specifically, even when running the plurality of operational event determining routines, the event determining part 33 may specify the event by running any one of the operational event determining routines. In this case, the event determining part 33 is configured not to run the following operational event determining routines.

The control executing part 34 controls operations based on the user's input when the user inputs to the operational panel 4. When the gesture is input by the user to the touch sensor 6a, the control executing part 34 receives the event specified by the aforementioned event determining part 33 and controls operations based on the event. When at least one of the operational keys 6b is pressed by the user, the control executing part 34 receives an operational signal directly from the operational key 6b and specifies the gesture (event) input by the user based on the received operational signal. The control executing part 34 then controls operations based on the gesture.

When controlling based on the user's input, the control executing part 34 controls, for example, update of the screen displayed on the display unit 5, or start and termination of execution of the job. The control executing part 34, therefore, controls the display controlling part 32 and the job executing part 35 as shown in FIG. 4. More specifically, the control executing part 34 gives instructions to update the screens to the display controlling part 32 for updating the screen in response to the user's input, and gives instructions to start or terminate execution of the job to the job executing part 35 for starting or terminating execution of the job. Thus, the controlling part 32 updates the screen displayed on the display unit 5 in response to the instruction by the control executing part 34. Also, the job executing part 35 starts execution of the job or terminates the job already being executed in response to the instruction by the control executing part 34. The control executing part 34, however, is capable of controlling other operations besides ones described above.

The job executing part 35 controls operations of each part of the image processing device 1, thereby controlling execution of the job given by the user. The job executing part 35 is resident in the CPU 11 to control overall operations of each part while the job is executed on the image processing device 1.

Figure 8:
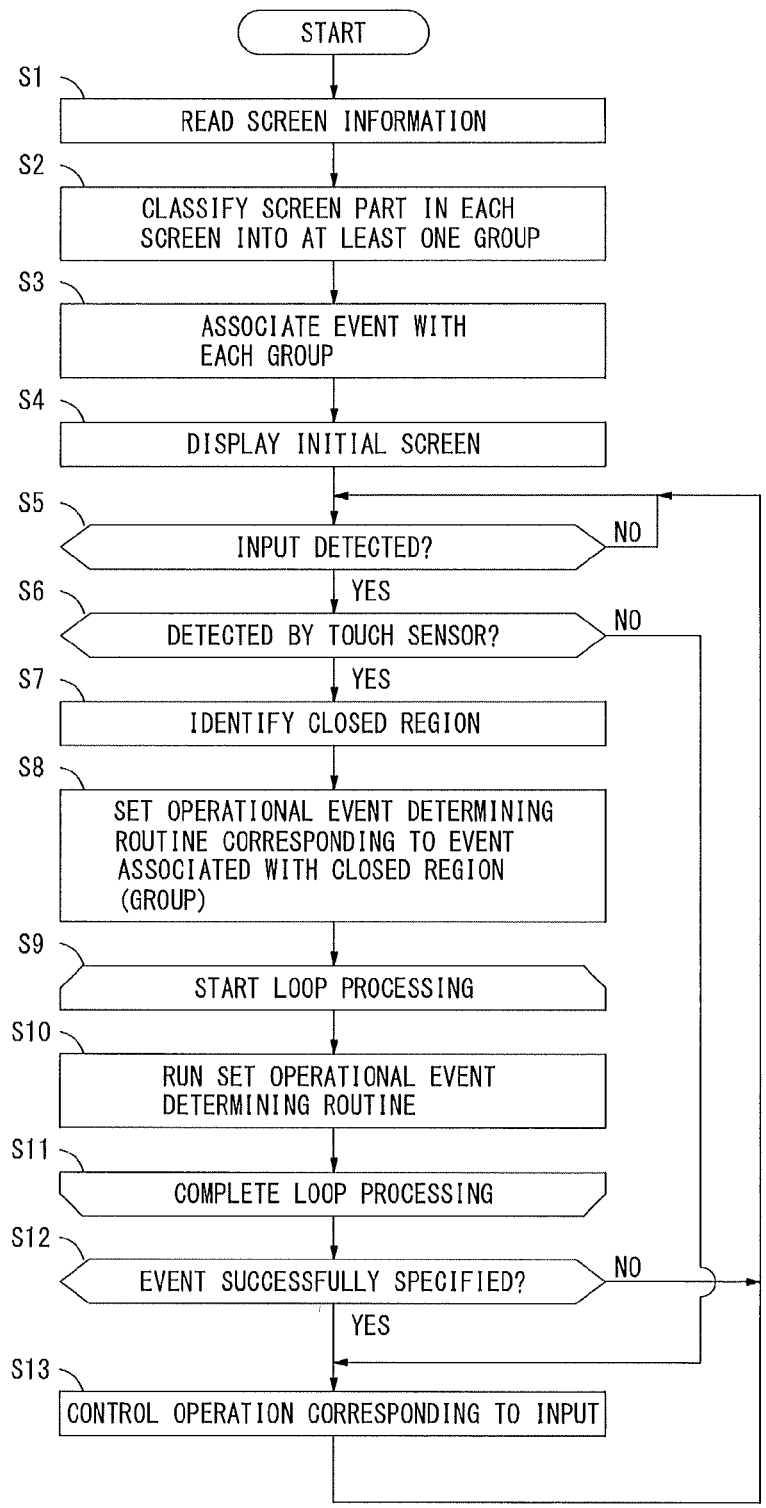
FIG. 8 is a flow diagram explaining an exemplary sequential procedure of the process performed on the image processing device.

The detailed sequential procedure of the process performed by the CPU 11 having the aforementioned functional configuration is described next. FIG. 8 is a flow diagram explaining an exemplary sequential procedure of the process performed by the CPU 11 of the image processing device 1. This process is performed after the image processing device 1 is powered on and the main program 13a of the program 13 is run by the CPU 11.

In response to running the main program 13a, the CPU 11 reads the screen information 16 (step S1), and groups the multiple screen parts contained in each screen into one or more closed regions based on the read screen information 16 (step S2) and associates the common event with each group (step S3). After grouping for every screen and associating the event with each group, the CPU 11 displays the initial screen on the display unit 5 of the operational panel 4 (step S4). With the screen displayed on the display unit 5 as described above, the CPU 11 allows receiving the user's input and is put into a standby state until either the touch sensor 6a or one of the operational keys 6b detects the input (step S5).

After the user's input is detected (when a result of step S5 is YES), the CPU 11 determines whether or not the input is detected by the touch sensor 6a (step S6). If the input is detected by the touch sensor 6a (when a result of step S6 is YES), the CPU 11 identifies the closed region where the input is detected (step S7). The CPU 11 sets the operational event determining routine corresponding to one or more events associated with the identified closed region (step S8), then running the set one or more operational event determining routines one after the other to perform loop processing to specify the event corresponding to the user's input (steps S9, S10 and S11).

In this loop processing (steps S9, S10 and S11), all the operational event determining routines 13b to 13h included in the program 13 are not run one after the other. Instead of that, only the operational event determining routine which is set in step S8 and corresponding to the event which can be commonly received by the closed region where the user's input is detected is run. More than one operational event determining routine may be run one after the other in the loop processing. In such a case, after the event corresponding to the user's input is specified by running one of the operational event determining routines, the loop processing is complete at the time when the event is specified and the CPU 11 is moves on to processing in step S12. To be more specific, in the loop processing (steps S9, S10 and S111), all of more than one operational event determining routine set in step S8 are not always run. If the event corresponding to the user's input is specified before running all of more than one operational event determining routine, the loop processing is complete without running the operational event determining routine which is to be run after the operational event determining routine with which the event is specified.

After completing the loop processing (steps S9, S10 and S11), the CPU 11 determines whether or not the event is specified through the loop processing (steps S9, S10 and S11) (step S12). The user sometimes inputs the gesture which is not receivable on the screen being displayed, so the determination in step S12 is required. When the event corresponding to the user's input is not specified (when a result of step S12 is NO), the CPU 11 returns to the standby state until the user's input is detected again (step S5) without performing the following processing (step S13). When the event corresponding to the user's input is successfully specified through the loop processing (steps S9, S10 and S11) (when a result of step S12 is YES), the CPU 11 moves on to the processing in next step S13.

When the user's input is detected (when a result of step S5 is YES) and the user's input is detected by the operational keys 6b (when a result of step S6 is NO), the CPU 11 moves on to the processing in step S13. Specifically, when the user presses at least one of the operational keys 6b, the event may be detected based on the operational signal, so the CPU 11 moves on to the processing (step S13) which is carried out when the event is successfully specified.

In response to successfully specifying the event corresponding to the user's input, the CPU 11 controls operations corresponding to the user's input (step S13). To be more specific, the CPU 11 then controls update of the screen displayed on the display unit 5 to another screen, execution of the job or other operations as described above. The CPU 11 then returns to step S5 to wait for detection of the user's input again (step S5). The CPU 11 then repeats the aforementioned processing.

The CPU 11 performs the processing as described above, thereby performing the processing corresponding to the input when the input is performed by the user on the operational panel 4. Especially the aforementioned processing is sometimes performed in parallel with execution of the job. When, however, some kind of gesture is input by the user on the screen, minimum operational event determining routine is run in order to specify only the event that can be received on the region where the gesture is input. As a result, unnecessary operational event determining routine is not required to be run in execution of the job, so the event corresponding to the user's gesture may be specified efficiently.

Next, the event associated with each region of the respective screens is explained with some exemplary screens displayed on the display unit 5 of the present preferred embodiment.

Figure 9:
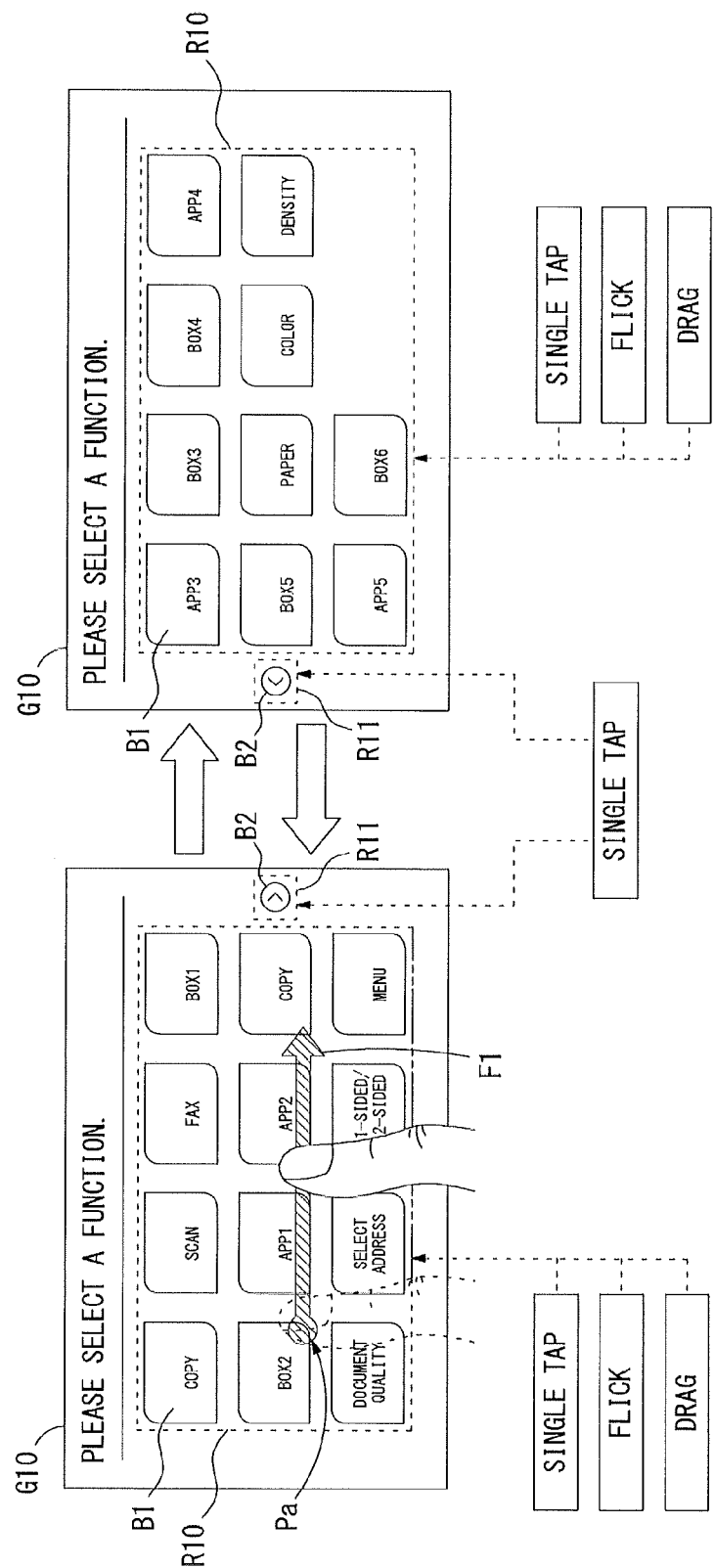
FIG. 9 shows an example of a function selecting screen.

FIG. 9 shows an example of a function selecting screen G10. The function selecting screen G10 has its screen structure including multiple icon images B1 corresponding to the functions may be selected by the user that are arranged in the screen as the screen parts (operational keys). The icon images B1 shown in the function selecting screen G10 may be added due to addition of optional features, installation of new application programs or customization of screens. The customization of screens, for example, includes that due to additional registration with the function selecting screen G10 of the icon images usually shown in another screen as shortcut keys.

The exemplary screen illustrated in FIG. 9 shows that 12 icon images that can be displayed at once in the function selecting screen G10, and 22 icon images B1 are registered for display. Thus, all of 22 icon images B1 can be displayed by scrolling sideways the region in which the icon images B1 are displayed. Operational keys B2 that can be single tapped by the user to scroll before and after scrolling are shown as the screen parts in the ends of both sides of the function selecting screen G10.

With this screen structure, the gestures the user is allowed to input with the icon images B1 are single tapping to touch the icon images B1 to select the function, flicking to scroll sideways the region in which the icon images B1 are displayed, and dragging to move the displayed icon images B1 in any direction. As illustrated in FIG. 9, for example, the user flicks by using his or her finger to tap a point Pa on the screen and move the tapped position quickly in a scrolling direction F1, then releasing the finger from the screen. The user flicks the region in which the multiple icon images B1 are displayed on the function selecting screen G10, thereby scrolling sideways the multiple icon images B1 as shown in FIG. 9. As a result, the user is allowed to view all the icon images B1. The user makes single tap by using his or her finger to tap a point on the screen and immediately release the finger from the screen. The user makes single tap to one of the displayed icon images B1, thereby selecting one of the multiple icon images B1. The user drags by using his or her finger to tap a point P1 on the screen and move the tapped position, then releasing the finger from the screen at another position. The tapped position may be moved in any direction and it does not have to be a line direction. Also, the user may move the tapped position at a relatively slow rate. The user drags one of the icon images B1, thereby moving the displayed icon image B1 to any position. As described above, the icon images B1 are the screen parts capable of receiving three events, single tapping, dragging and flicking, and not receiving other events.

The operational key B2 displayed at the end of the function selecting screen G10 is the screen part capable of receiving only single tapping by the user. So, when the user makes single tap to the operational key B2, the multiple icon images B1 are scrolled sideways and other icon images B1 are displayed.

For the screen structure of FIG. 9, the grouping part 31 groups together the multiple icon images B1 to form a closed region R10 and forms another closed region R11 which includes only the operational key B2. The grouping part 31 sets three events, single tapping, dragging and flicking, corresponding to the group of the closed region R10, and sets the event, single tapping, corresponding to the group of the closed region R11.

FIGS. 10A, 10B and 10C show an example of an address selecting screen G11 on which multiple pieces of address information is shown in a list form. As illustrated in FIG. 10A, the address selecting screen G11 contains as the screen parts a list region R12 showing the multiple pieces of address information in a list form and a scroll bar B3 with which the address information displayed in the list region R12 is scrolled.

The gestures the user is allowed to input on the list region R12 of the screen having aforementioned structure is single tapping to select one of the multiple pieces of address information displayed in the list form as illustrated in FIG. 10A and flicking to scroll up and down the multiple pieces of address information displayed in the list region R12 as illustrated in FIG. 10B. The user, for example, taps a point on the list region R12 and flicks in a scrolling direction F2 or F3 with tapping the point, thereby scrolling the address information displayed in the list region R12. Also, the user may drag to move the displayed address information shown in the list form, double tap to select one of the address information and switch to a detail setting screen for the selected address or long tap to select one of the address information and display detailed information of the selected address. The user makes double tap by inputting the gesture similar as the single tapping twice in a predetermined period of time. The user makes long tap by tapping a point on the screen and keeping tapping the point for a predetermined period of time or longer without moving the tapped point. As described above, the list region R12 is the screen part which is capable of receiving five events, single tapping, dragging, flicking, double tapping and long tapping, and not receiving other events.

The scroll bar B3 displayed right side of the list region R12 is the screen part which is capable of receiving the events input by the user, single tapping and dragging. The user makes single tap the scroll bar B3, thereby scrolling to see the address information displayed in the list region R12 in response to the tapped position. The user drags the scroll bar B3, thereby scrolling to see the address information displayed in the list region R12 in response to the moving distance.

For the above-described address selecting screen G11, the grouping part 31 forms two regions, the closed region R12 which only includes the list region R12 and the closed region R13 which only includes the scroll bar B3 as illustrated in FIG. 10C. In this case, the grouping part 31 sets five events, single tapping, flicking, dragging, double tapping and long tapping, corresponding to the group of the closed region R12, and sets two events, single tapping and dragging, corresponding to the group of the closed region R13.

Figure 11A:
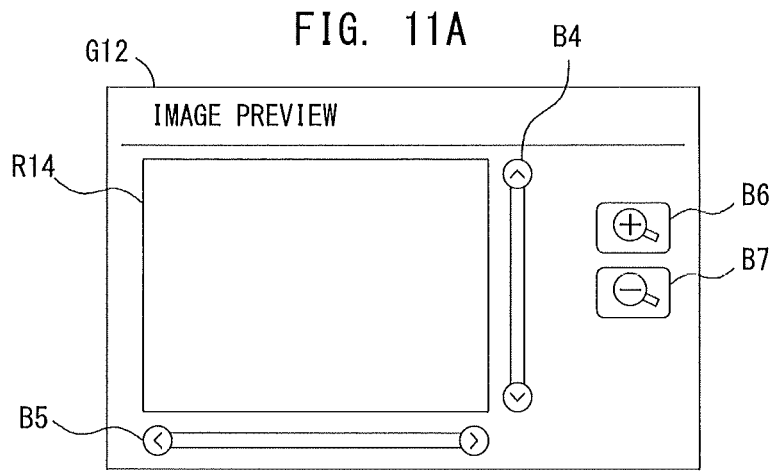
FIGS. 11A and 11B show an example of a preview image screen that shows a preview of an image.
Figure 11B:
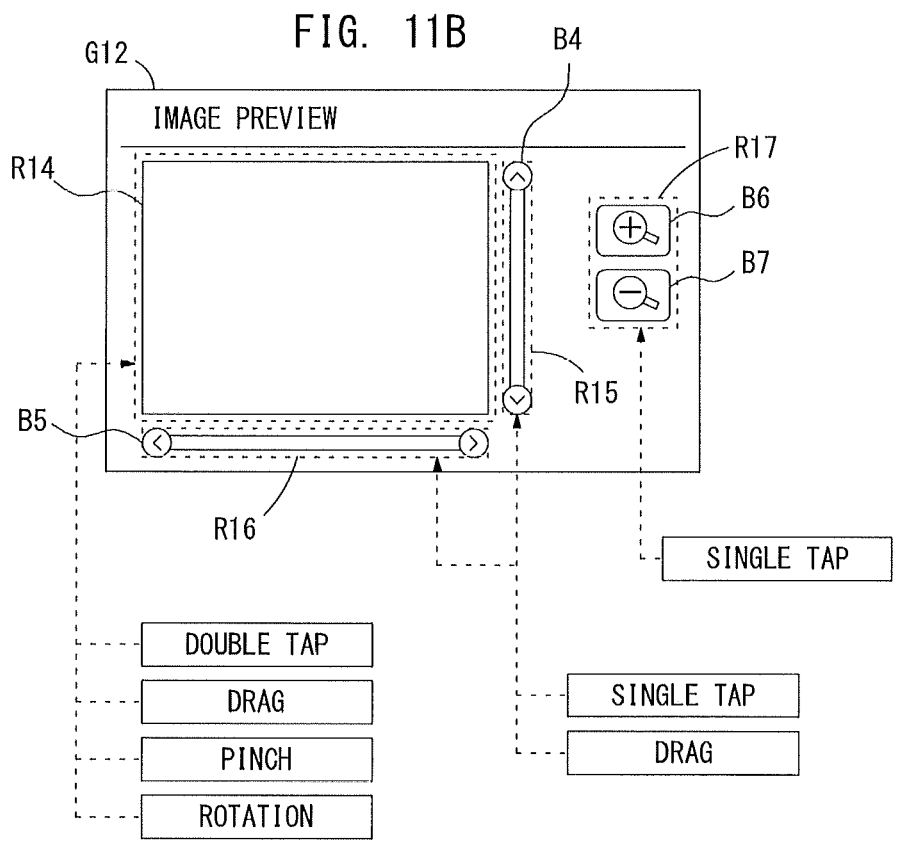

FIGS. 11A and 11B show an example of a preview image screen G12 that shows a preview of the image. The preview image screen G12 contains as the screen parts a preview region R14 in which a preview of an image selected by the user is displayed, scroll bars B4 and B5 to move the displayed image in the preview region R14 and operational keys B6 and B7 to zoom in or out the displayed image in the preview region R14.

Figure 12A:
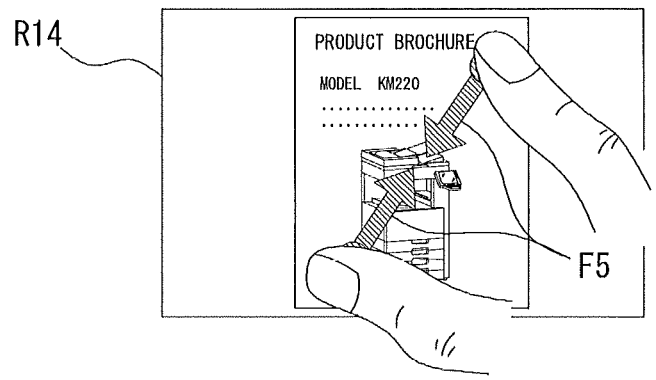
FIGS. 12A, 12B and 12C show an example of gestures that may be input by a user on a preview region.
Figure 12B:
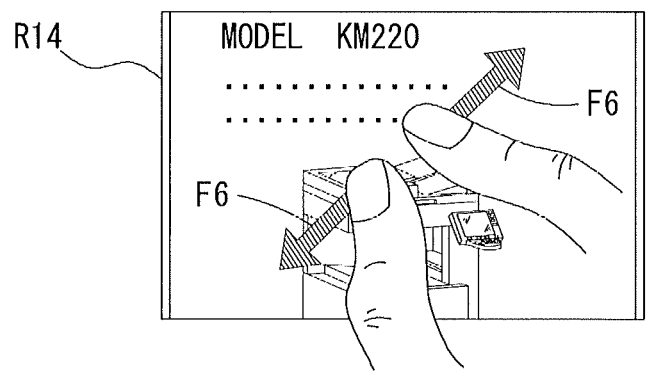
Figure 12C:
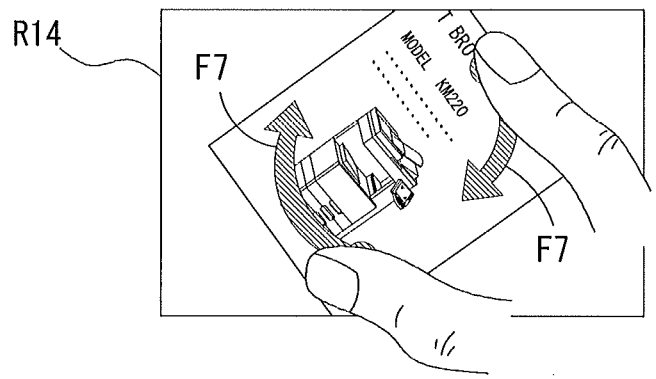

FIGS. 12A, 12B and 12C show an example of gestures that may be input by the user on the preview region R14. When the preview image is displayed in the preview region R14, the user is allowed to input pinching or rotation to zoom in, out or rotate the preview image as shown in FIGS. 12A, 12B and 12C. This pinching includes pinching in and pinching out. The user is allowed to zoom in the preview image by pinching in and to zoom out by pinching out. The user pinches in by using two fingers to tap two points of the preview image displayed in the preview region R14 and move two fingers around to shorten the distance between the two points with tapping the two points as shown with arrows F5 of FIG. 12A. The user pinches in, thereby zooming in the preview image displayed in the preview region R14. The user pinches out by using two fingers to tap two points of the preview image displayed in the preview region R14 and move two fingers around to open the distance between the two points with tapping the two points as shown with arrows F6 of FIG. 12B. The user pinches out, thereby zooming out the preview image displayed in the preview region R14. The user rotates by using two fingers to tap two points of the preview image displayed in the preview region R14 and move two fingers around to turn the position between the two points with tapping the two points as shown with arrows F7 of FIG. 12C. The user rotates, thereby turning the preview image displayed in preview region R14.

The preview region R14 is capable of receiving not only the aforementioned pinching and rotation but also double tapping and dragging. More specifically, the user makes double tap by taping twice the point of the preview image displayed in the preview region R14, and the preview image is enlarged based on the tapped point. Moreover, when the user drags the preview image in the preview region R14, the displayed preview image is moved for display. As described above, the preview region R14 is the screen part which is capable of receiving four events, double tapping, dragging, pinching and rotation, and not receiving other events.

The scroll bars B4 and B5 displayed right side and bottom of the preview region R14 are the screen parts which are capable of receiving the events input by the user, single tapping and dragging. With the scroll bars B4 and B5, the displayed preview image in the preview region R14 may be moved in response to the input event. Moreover, the operational keys B6 and B7 to zoom in or out the displayed image in the preview region R14 are the screen parts that are capable of receiving only single tapping.

For the above-described preview screen G12, the grouping part 31 forms four regions, the closed region R14 which only includes the preview region R14, the closed region R15 which only includes the scroll bar B4, the closed region R16 which only includes the scroll bar B5 and the closed region R17 which includes two operational keys B6 and B7 as illustrated in FIG. 11B. In this case, the grouping part 31 sets four events, double tapping, dragging, pinching and rotation, corresponding to the group of the closed region R14, two events, single tapping and dragging, corresponding to the group of the closed region R15, two events, single tapping and dragging, corresponding to the group of the closed region R16 and an event, single tapping, corresponding to the group of the closed region R17. The closed regions R15 and R16 may be classified together to form one closed region as a group.

Figure 13:
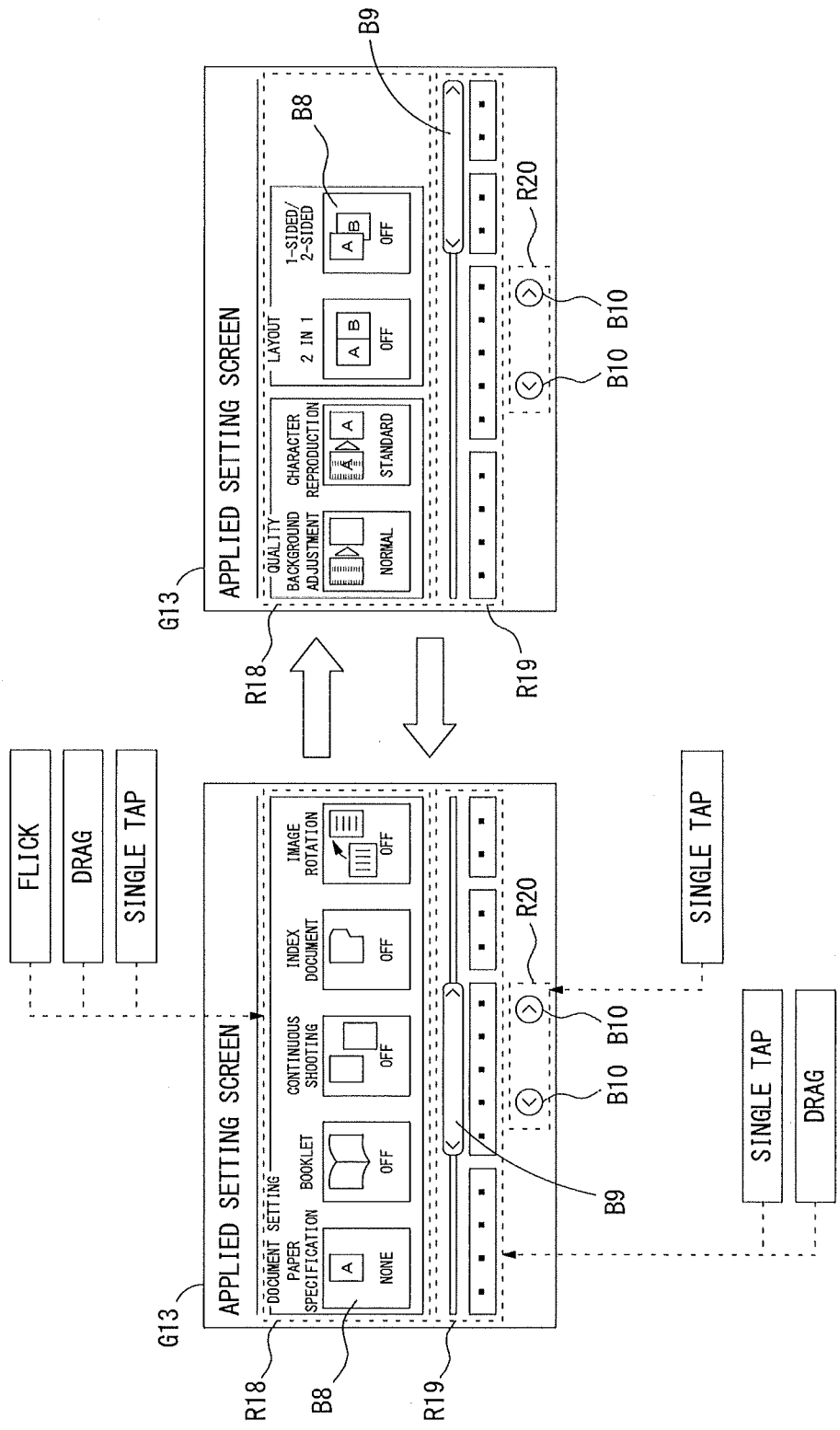
FIG. 13 shows an example of an applied setting screen for the user to configure a variety of settings.

FIG. 13 shows an example of an applied setting screen G13 for the user to configure a variety of settings. The applied setting screen G13 contains as the screen parts multiple icon images B8 registered in advance to configure a variety of applied settings, a scroll bar B9 with which continuous icon images B8 can be laterally scrolled and operational keys B10 which can be single tapped to switch the displayed icon images B8 in horizontal direction at his or her fingertips. More specifically, on the exemplary screen of FIG. 13, the number of the icon images B3 registered in advance with the applied setting screen G13 is more than the number of the icon images that can be displayed at once on the screen. Thus, the applied setting screen G13 allows the multiple icon images B8 registered with the applied setting screen G13 to be laterally scrolled so that every icon image B8 is allowed to be displayed.

On the applied setting screen G13 having the above-described screen structure, the user is allowed to single tap, flick and drag each of the multiple icon images B8. The user makes single tap to the icon image B8 to select the setting item, flicks to scroll sideways the region in which the icon images B8 are displayed and drags to move the displayed icon image B8 to any position. Thus, the multiple icon images B8 are the screen parts which are capable of receiving three events, single tapping, flicking and dragging, and not receiving other events.

The user is also allowed to single tap and drag the scroll bar B9 which is similar to the aforementioned other scroll bars. Moreover, the user is allowed to only single tap the operational keys B10 which is similar to the aforementioned other operational keys.

For the above-described applied setting screen G13, the grouping part 31 forms three regions, the closed region R18 which includes the multiple icon images B8, the closed region R19 which only includes the scroll bar B9, and the closed region R20 which includes the operational keys B10 as illustrated in FIG. 13. In this case, the grouping part 31 sets three events, flicking, dragging and single tapping, corresponding to the group of the closed region R18, two events, single tapping and dragging, corresponding to the group of the closed region R19, and an event, single tapping, corresponding to the group of the closed region R20.

Figure 14:
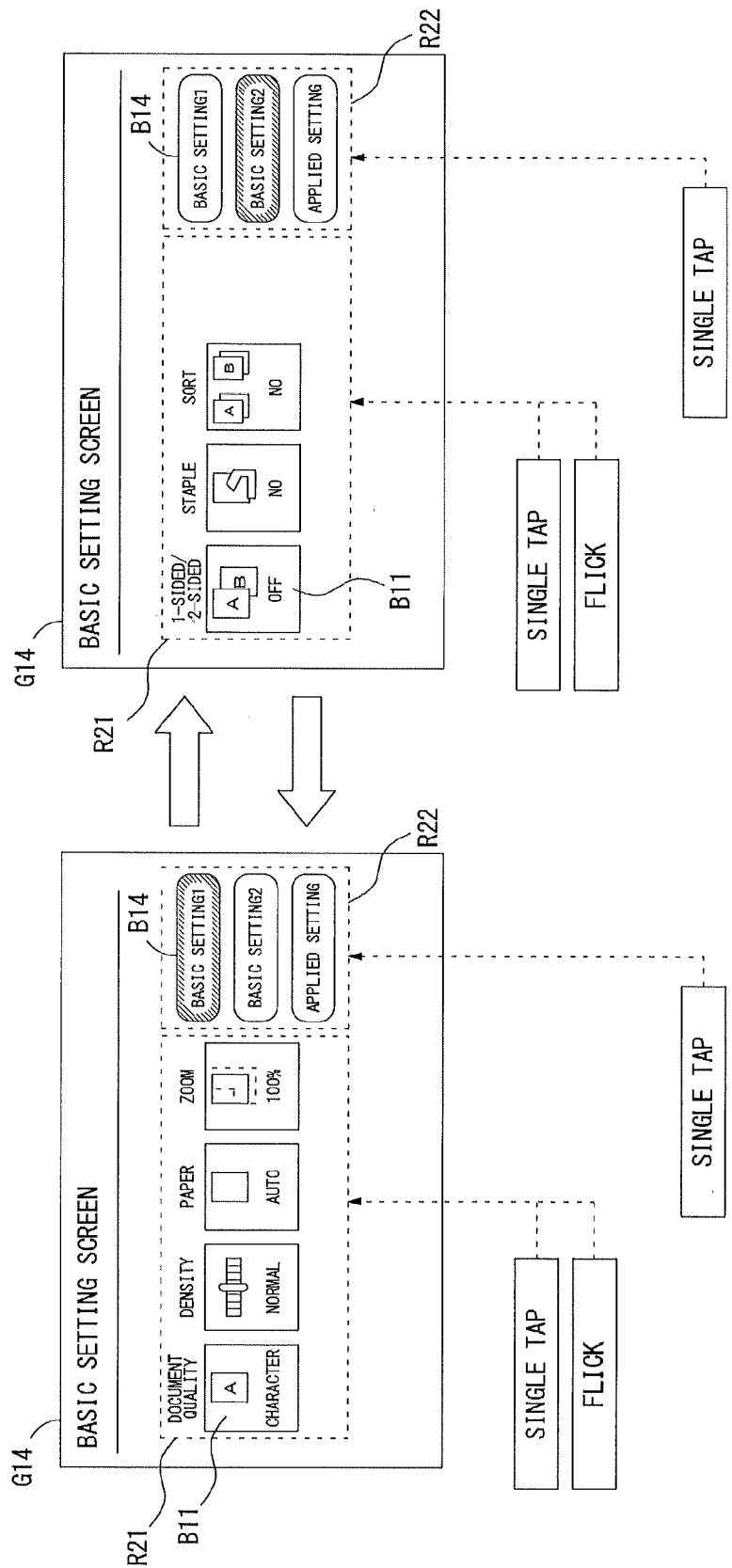
FIG. 14 shows an example of a basic setting screen for the user to configure a variety of settings.

FIG. 14 shows an example of a basic setting screen G14 for the user to configure a variety of settings. The basic setting screen G14 contains as the screen parts multiple icon images B11 registered in advance to configure basic settings as to execution of jobs and operational keys B14 which can be single tapped to switch the displayed multiple icon images B11 at the user's fingertips. More specifically, on the exemplary screen of FIG. 14, the number of the icon images B11 registered in advance with the basic setting screen G14 is more than the number of the icon images that can be displayed at once on the screen. Thus, the basic setting screen G14 allows switching the icon images B11 displayed on the basic setting screen G14 for display.

On the basic setting screen G14 having the above-described screen structure, the user is allowed to single tap and flick each of the multiple icon images B11. The user makes single tap to the icon image B11 to select the setting item, and flicks to switch the displayed icon images B11 on the basic setting screen G14 to another icon image. Thus, the multiple icon images B11 are the screen parts which are capable of receiving two events, single tapping and flicking, and not receiving other events.

The user is allowed to only single tap the operational keys B14 which is similar to the aforementioned other operational keys. The operational keys B14 are the screen parts which are capable of receiving an event, single tapping, and not receiving other events.

For the above-described basic setting screen G14, the grouping part 31 forms two regions, the closed region R21 which includes the multiple icon images B11 and the closed region R22 which includes the operational keys B14 as illustrated in FIG. 14. In this case, the grouping part 31 sets two events, single tapping and flicking, corresponding to the group of the closed region R21, and an event, single tapping, corresponding to the group of the closed region R22.

On the basic setting screen G14 of FIG. 14, two closed regions R21 and R22 formed by the grouping part 31 are next to each other, and the events associated with the closed region R22 share a common event with a part of the multiple events associated with the closed region R21. When grouping and forming two regions having aforementioned relation, the grouping part 31 may form the closed region R21 to be included in another closed region R22 so that the common event among both regions may be determined at once.

Figure 15:
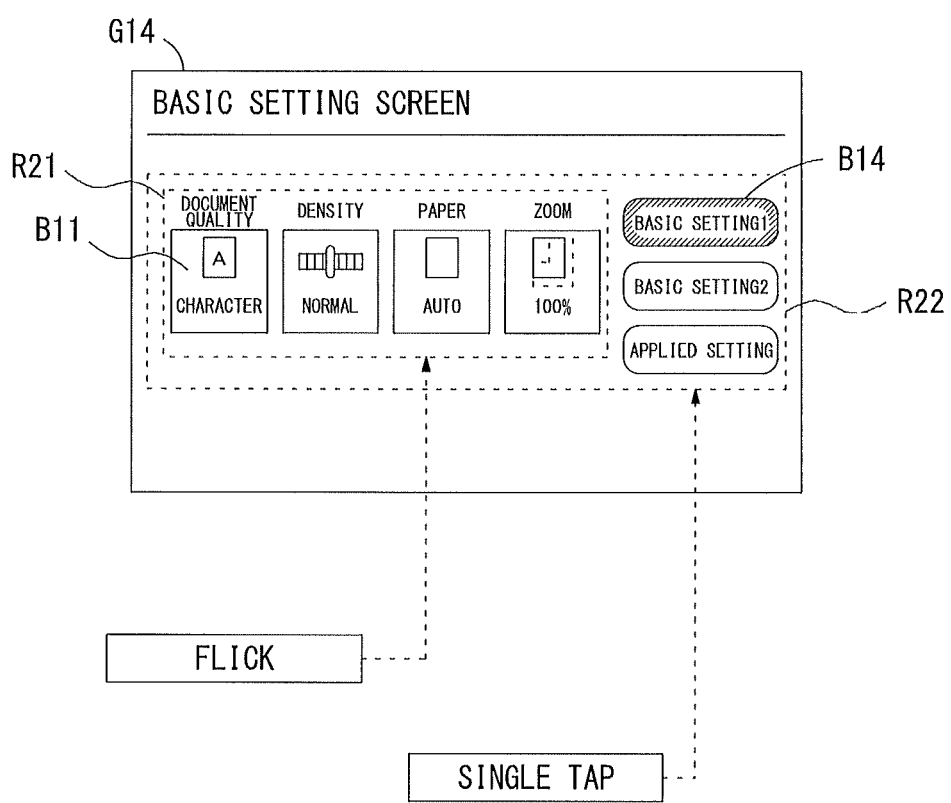
FIG. 15 shows an example of the basic setting screen when a closed region is formed in another closed region.

FIG. 15 shows an example of the basic setting screen G14 when the closed region R21 is formed in another closed region R22. The grouping part 31 forms regions by adding another closed region R21 inside of the closed region R22 as shown in FIG. 15. Then, parent-child relation is created between the two closed regions R21 and R22. More specifically, the parent region R22 includes whole the sub region R21. When creating this kind of parent-child relation, the grouping part 31 associates the common event among the parent region R22 and the sub region R21 with the parent region R22, and the event specific to the sub region R21 which is not associated with the parent region R22 with the sub region R21. In the example of FIG. 15, the common event among the parent region R22 and the sub region R21, single tapping, is associated with the parent region R22. The event specific to the sub region R21, flicking, is associated with the sub region R21.

The parent-child relation is created between the two closed regions R21 and R22 as described above. In this case, after the user's input is detected in the sub region R21, the event determining part 33 runs the operational event determining routines corresponding to the events associated with each of the parent region R22 and the sub region R21 one after the other, thereby specifying the event corresponding to the input by the user. The event determining part 33 preferably runs the operational event determining routine corresponding to the event associated with the sub region R21 first.

Figure 16:
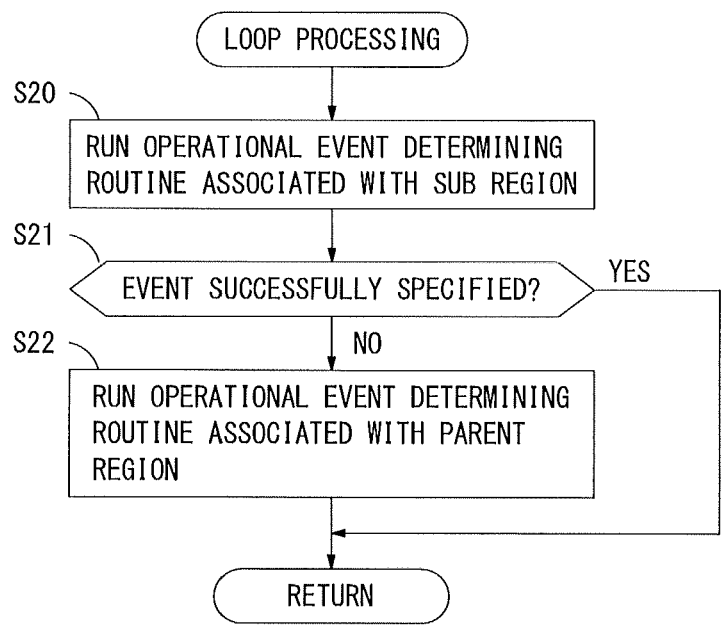
FIG. 16 is a flow diagram explaining the exemplary sequential procedure of a loop processing when the closed region where the use's input is detected includes two regions having a parent-child relation.

FIG. 16 is a flow diagram explaining the exemplary sequential procedure of the aforementioned loop processing (steps S9, S10 and S11) when the region where the use's input is detected includes two closed regions having the parent-child relation. By referring to FIG. 16, upon start of this aforementioned loop processing (steps S9, S10 and S11), the CPU 11 runs the operational event determining routine corresponding to the event associated with the sub region R21 first (step S20). It is assumed, for example, two regions have the parent-child relation as described with FIG. 15. In this case, the CPU 11 runs the operational event determining routine 13e corresponding to flicking first in step S20, and determines whether or not the user's input is flicking. If more than one event is associated with the sub region R21, the CPU 11 runs the plurality of operational event determining routines one after the other in step S20, thereby determining whether or not the user's input is the event associated with the sub region R21.

The CPU 11 then determines if the event corresponding to the user's input is successfully specified (step S21). When the event corresponding to the user's input is successfully specified with only the determination of the sub region R21 (when a result of step S21 is YES), the CPU 11 completes the loop processing without conducting the determination as to the parent region R22.

When the event corresponding to the user's input is not specified with only the determination of the sub region R21 (when a result of step S21 is NO), the CPU 11 runs the operational event determining routine corresponding to the event associated with the parent region R22 next (step S22). It is assumed, for example, two regions have the parent-child relation as described with FIG. 15. In this case, the CPU 11 runs the operational event determining routine 13b corresponding to single tapping in step S22, and determines whether or not the user's input is single tapping. If more than one event is associated with the parent region R22, the CPU 11 runs the plurality of operational event determining routines one after the other in step S22, thereby determining whether or not the user's input is the event associated with the parent region R22.

When the closed regions having the parent-child relation are formed by the grouping part 31, the operational event determining routine corresponding to the event associated with the sub region R21 is run first. So, when the user's input is detected in the sub region, it allows determining whether or not the event is specific to the sub region first. The event specific to the sub region may be specified at a relatively early stage, resulting in enhanced process efficiency.

Figure 17A:
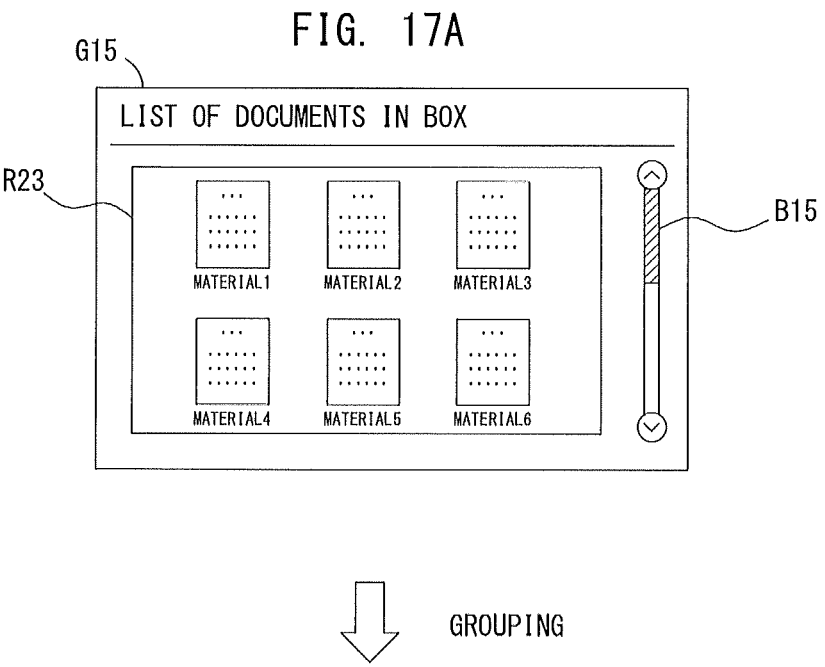
FIGS. 17A and 17B show an example of a document list screen showing a list of documents in a BOX.
Figure 17B:
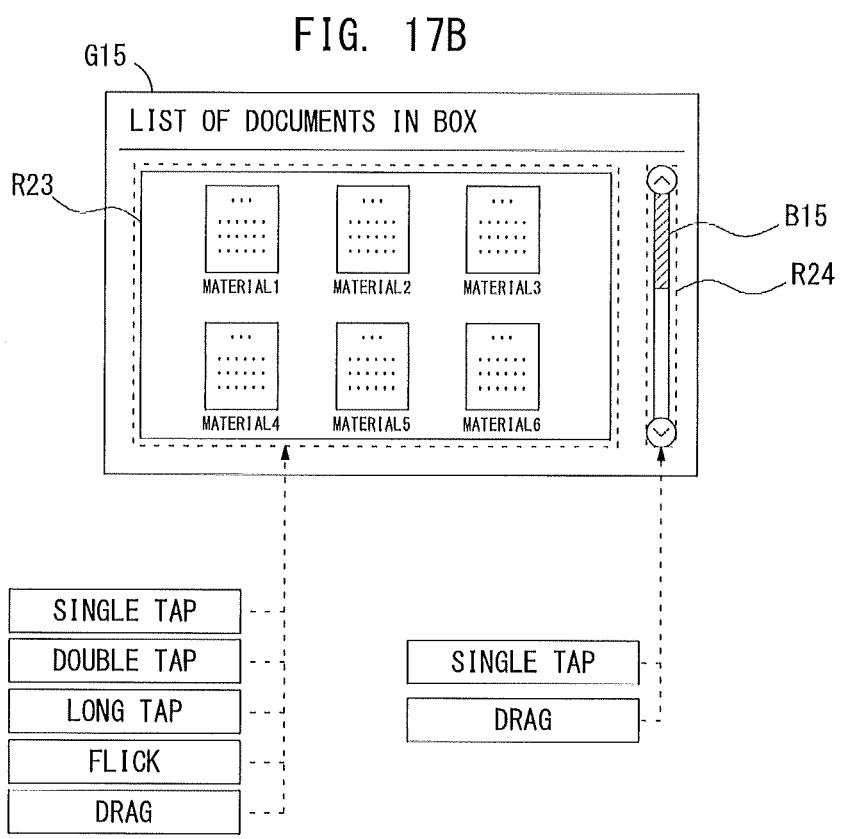
Figure 19A:
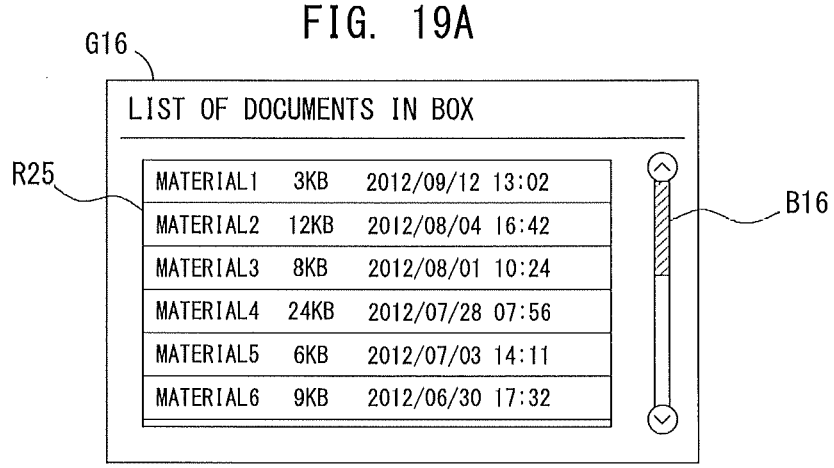
FIGS. 19A and 19B show an example of the document list screen showing a list of documents in a BOX in a different manner from FIGS. 17A and 17B.
Figure 19B:
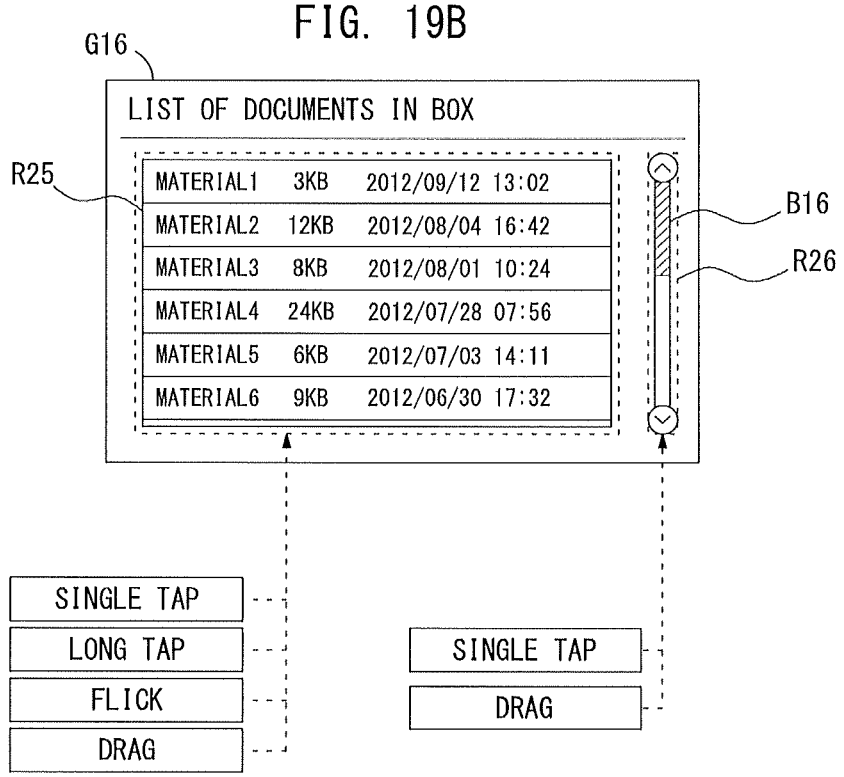

Next, examples of screens which show lists of document data stored in a BOX (storage region) of the storage device 23. FIG. 17AB and FIG. 19AB show an example of document list screens G15 and G16, each of which showing listed documents in the BOX. The document list screen G15 shown in FIGS. 17A and 17B shows a list of document data stored in the BOX designated by the user as thumbnail images. The document list screen G16 shown in FIGS. 19A and 19B shows document data stored in the BOX designated by the user in a list form. The same information is displayed on the document list screens G15 and G16 shown in FIGS. 17AB and 19AB in a different manner.

The thumbnail image screen G15 of FIG. 17A contains as the screen parts a thumbnail image region R23 in which a thumbnail image of document data is displayed and a scroll bar B15 with which the thumbnail image displayed in the thumbnail image region R23 is scrolled. The thumbnail image screen G15 of FIG. 17A has a screen structure which allows scrolling the displayed thumbnail images corresponding to every document data stored in the BOX designated by the user for display. The five gestures the user is allowed to input on the thumbnail image region R23 are single tapping, double tapping, long tapping, flicking and dragging. The user makes single tap to select one of the thumbnail images, and makes double tap to select one of the thumbnail images and zoom out the selected thumbnail image. The user makes long tap to select one of the thumbnail images and display images such as icon images around the selected thumbnail image, and flicks to scroll the thumbnail images. The user also drags to move the displayed thumbnail image in any direction. As described above, the thumbnail image region R23 is the screen part which is capable of receiving five events, single tapping, double tapping, long tapping, flicking and dragging, and not receiving other events.

Figure 18:
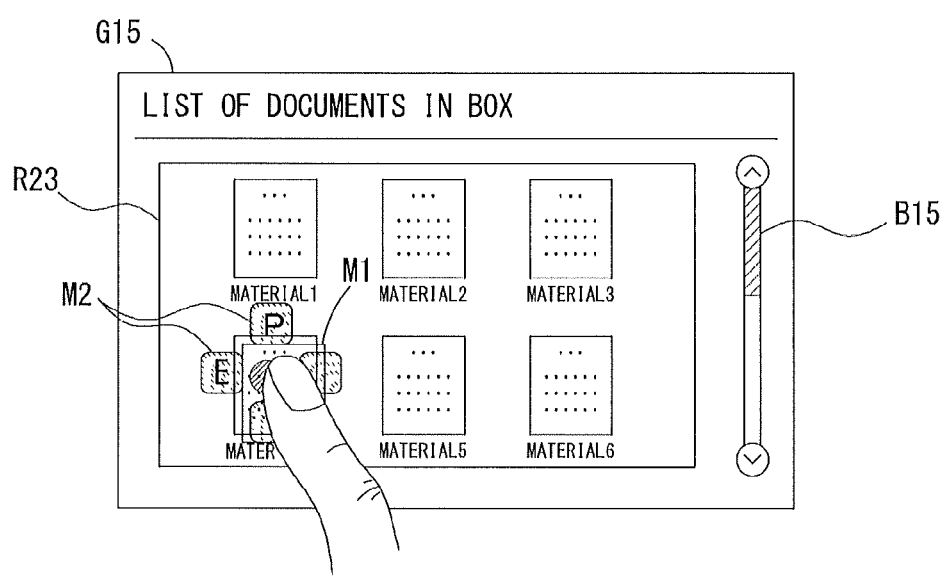
FIG. 18 shows an example of a screen change when long tapping is input on the document list screen.

The gesture to long tap the thumbnail image region R23 is explained in detail next. When the user selects one of the thumbnail images and makes long tap to the selected thumbnail image as illustrated in FIG. 18, a transmissive image M1 being the same as the selected thumbnail image is displayed near the long tapped thumbnail image. Also, at least one shortcut icon image M2 is displayed around the transmissive image M1. The transmissive image M1 is an image to inform the user of long tapping. The user drags the selected thumbnail image (or the transmissive image M1) to the shortcut icon image M2, thereby specifying the process on the image data. When the gesture of long tap to one of displayed thumbnail images input by the user is detected, the transmissive image M1 and at least one shortcut icon image M2 are displayed by the display controlling part 32.

The gestures the user is allowed to input with the scroll bar B15 is single tapping and dragging so as to the above-described other scroll bars. Thus, the scroll bar B15 is the screen part which is capable of receiving two events, single tapping and dragging, and not receiving other events.

For the above-described thumbnail image screen G15 of FIG. 17A, the grouping part 31 forms two regions, the closed region R23 which only includes the thumbnail image region R23 and the closed region R24 which includes the scroll bar B15 as illustrated in FIG. 17B. In this case, the grouping part 31 sets five events, single tapping, double tapping, long tapping, flicking and dragging, corresponding to the group of the closed region R23, and two events, single tapping and dragging, corresponding to the group of the closed region R24.

The document list screen G16 shown in FIG. 19A contains as the screen parts a list region R25 in which information as to the document data is displayed in a list form and a scroll bar B16 with which the information displayed in the list region R25 is scrolled. To be more specific, the document list screen G16 of FIG. 19A has a screen structure which allows scrolling the information as to every document data stored in the BOX designated by the user for display. The four gestures the user is allowed to input on the list region R25 are single tapping, long tapping, flicking and dragging. The user makes single tap to select a piece of the document data, and makes long tap to select a piece of the document data and display the detailed file information. The user flicks to scroll the information displayed in the list region R25, and drags to move the displayed information in the list region R25. As described above, the list region R25 is the screen part which is capable of receiving four events, single tapping, long tapping, flicking and dragging, and not receiving other events. Also, the user is allowed to single tap and drag the scroll bar B16 so as to the above-described other scroll bars. Thus, the scroll bar B16 is the screen part which is capable of receiving two events, single tapping and dragging, and not receiving other events.

For the above-described document list screen G16 shown in FIG. 19A, the grouping part 31 forms two regions, the closed region R25 which only includes the list region R25 and the closed region R26 which includes the scroll bar B16 as illustrated in FIG. 19B. In this case, the grouping part 31 sets four events, single tapping, long tapping, flicking and dragging, corresponding to the group of the closed region R25, and two events, single tapping and dragging, corresponding to the group of the closed region R26.

In the present preferred embodiment as described above, even on the screens G15 and G16 displaying the same information in different manners, grouping is conducted based on the screen parts contained in each screen G15 and G16 so that the event depending on how each screen part is displayed may be associated. When the user inputs the gestures on the list region R15 with the document list screen G16 as illustrated in FIGS. 19A and 19B being displayed, the operational event determining routine 13c for determining double tapping is not run which is different from the document list screen G17 of FIGS. 17A and 17B. As a result, the event corresponding to the user's input may be specified efficiently.

Next, regrouping conducted by the grouping part 31 when the screen displayed on the display unit 5 is customized is explained. It has explained that, for example, the basic setting screen G14 of FIG. 14 has the screen structure that allows switching the icon images B11 displayed on the basic setting screen G14 for display when the number of the icon images B11 registered in advance is more than the number of the icon images that can be displayed at once on the screen. It is assumed that the number of the registered icon images is less than the number of the icon images that can be displayed at once on the screen. In such a case, the icon images are not necessary to be switched for display. If the icon image B11 is additionally registered in response to customization of the screen while the icon images are not necessary to be switched for display, and the number of the icon images displayed on the basic setting screen G14 tops the number of the icon images that can be displayed at once, it requires switching of the icon images B11 for display after that.

Figure 20A:
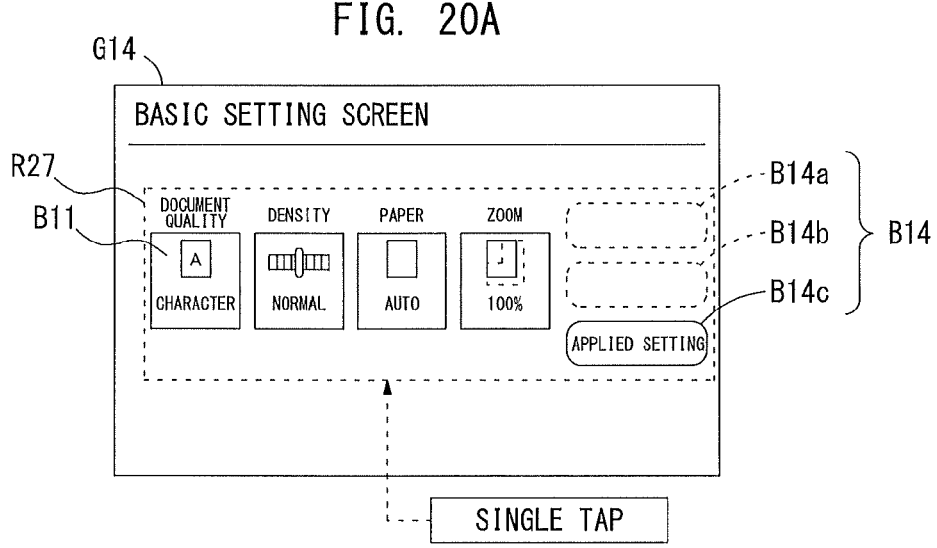
FIGS. 20A and 20B show an example of screen customization when an icon image is additionally registered with the basic setting screen.
Figure 20B:
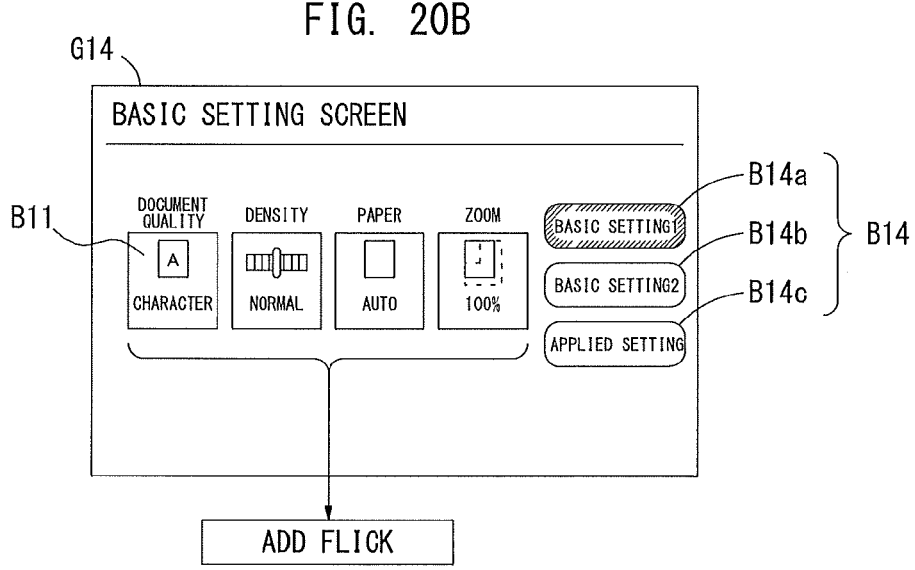

FIGS. 20A and 20B show an example of screen customization when the icon image B11 is additionally registered with the basic setting screen G14 as described above. As illustrated in FIG. 20A, it is assumed that all of the multiple icon images B11 registered in advance with the basic setting screen G14 can be displayed at once. In this case, operational keys B14a and B14b to switch the displayed icon images B11 of the operational keys B14 displayed right side of the multiple icon images B11 are not shown. Only the operational key B14c to switch the basic setting screen G14 to the applied setting screen G13 is shown. The basic setting screen G14 of FIG. 20A does not allow switching of the displayed icon images B11. So, the gesture the user is allowed input on each of the icon images B11 is only single tapping the icon image B11 to select setting item. Also, the gesture the user is allowed input on the operational key B14c is only single tapping. After classifying the screen parts contained in the basic setting screen G14 of FIG. 20A into groups, the grouping part 31 forms one closed region G27 by grouping the multiple icon images B11 and the operational key B14c together and associates the event, only the single tapping, with the closed region R27.

It is assumed that the icon image B11 is additionally registered with the basic setting screen G14 of FIG. 20A and the number of the icon images displayed on the basic setting screen G14 tops the number of the icon images that can be displayed at once. In this case, the operational keys B14a and B14b to switch the displayed icon images B11 are additionally shown, and the screen structure changes to the one which allows switching the displayed icon images B11 on the basic setting screen G14 for display. At this time, flicking is additionally registered as the event that can be received by the icon images B11 displayed on the basic setting screen G14 of FIG. 20B. Thus, the gestures the user is allowed to input on each of the multiple icon images B11 are switched to two gestures, single tapping to select setting item and flicking to switch the icon image B11 displayed on the basic setting screen G14 to another icon image.

It is assumed that the icon image B11 is deleted from the screen as illustrated in FIG. 20B and the screen is customized as shown in FIG. 20A. In such a case, flicking is deleted from the events that can be received by the icon images B11 displayed on the basic setting screen G14.

As described above, customization of the screen displayed on the display unit 5 may cause addition, deletion or change of the screen parts. In this case, the event that can be received by the screen part contained in the customized screen sometimes changes. The grouping part 31, therefore, determines whether or not regrouping of the screen parts contained in the screen is necessary in response to customization of the screen. If the grouping part 31 determines regrouping is necessary, it regroups and performs the process to associate the event again.

Figure 21:
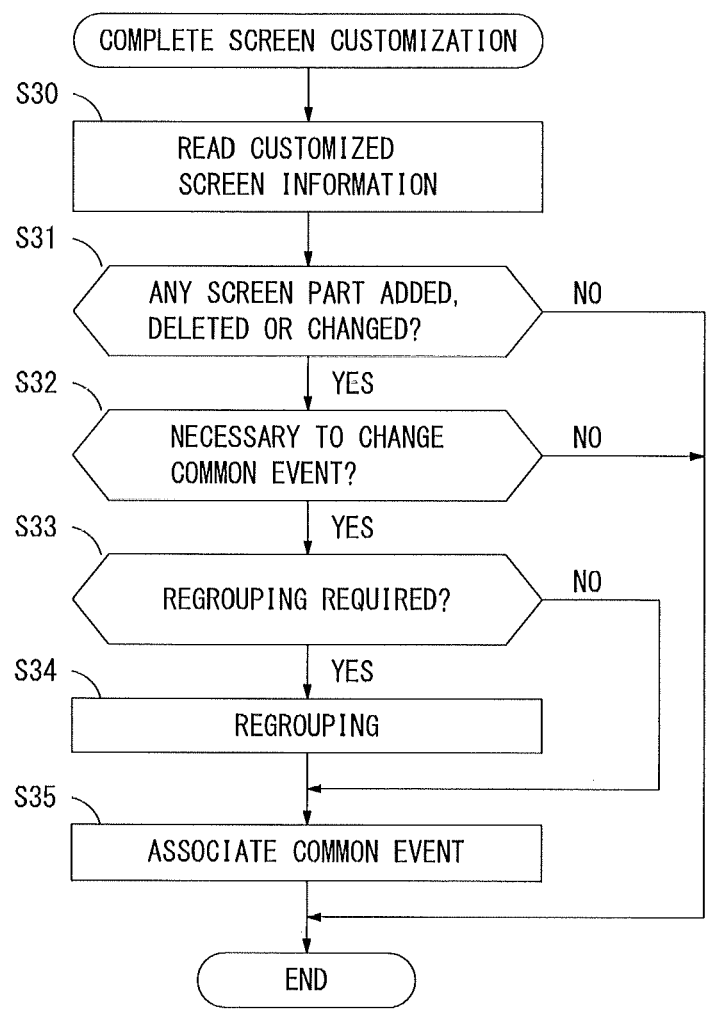
FIG. 21 is a flow diagram explaining the exemplary sequential procedure of the process performed for regrouping when the screen is customized.

FIG. 21 is a flow diagram explaining the exemplary sequential procedure of the process performed for regrouping when the screen is customized. This process is performed by the CPU 11 when the customization of the screen is complete. Upon start of the process, the CPU 11 reads the customized screen information 16 in the NVRAM 15 (step S30), and determines whether or not the screen part in the customized screen is added, deleted or changed (step S31). If no screen part is added, deleted or changed (when a result of step S31 is NO), this process completes. When the screen part is added, deleted or changed (when a result of step S31 is YES), the CPU 11 determines whether or not it is necessary to change the common event associated with each group (step S32). If it is necessary to change the event (when a result of step S32 is YES), the CPU 11 further determines if regrouping is necessary (step S33). When regrouping is necessary (when a result of step S33 is YES), the CPU 11 classifies again the multiple screen parts contained in the customized screen into at least one group (step S34). The closed regions having parent-child relation may be formed as described above. When regrouping is not necessary, the CPU 11 does not classify again the screen parts into at least one group. The CPU 11 then associates the common event with each closed region (group) formed on the customized screen (step S35). Even when the screen part is added, deleted or changed (when a result of step S31 is YES), it may be unnecessary to change the common event associated with each group (when a result of step S32 is NO). Then, the CPU 11 completes the process without regrouping.

As described above, even when the screen displayed on the display unit 5 is customized, the above-described process is performed so that regrouping is performed based on the customized screen. The common event to detect in the group which is created after the customization is then associated with each group. As a result, the event corresponding to the user's input may be specified in the right condition even after the customization.

Figure 22:
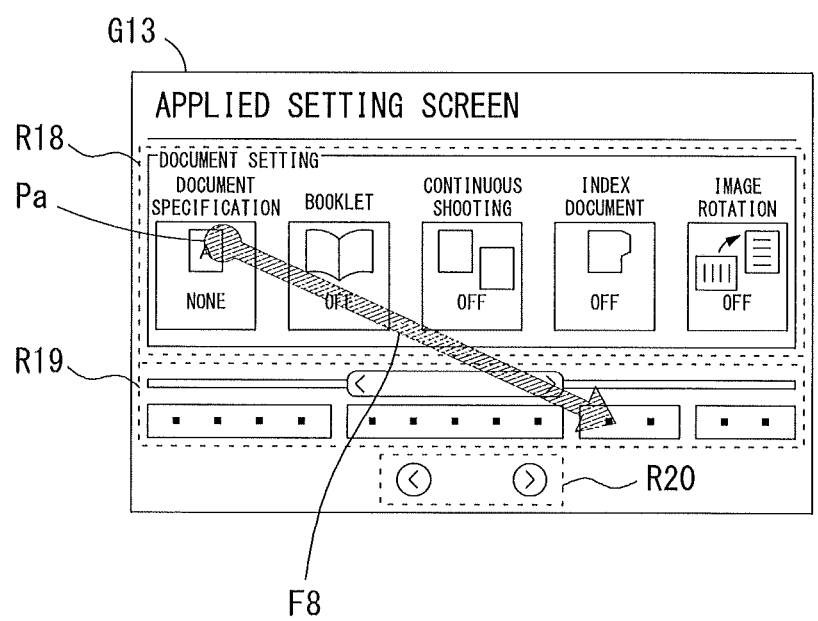
FIG. 22 shows an example of the gesture input by the user extends into the multiple closed regions on the applied setting screen.

A case where the user inputs the gesture extends into multiple closed regions on the screen displayed on the display unit 5 is described next. FIG. 22 shows an example of the gesture input by the user extends into the multiple closed regions R18 and R19 on the aforementioned applied setting screen G13. As illustrated in FIG. 22, the user, for example, firstly taps the point Pa on the closed region R18 of the applied setting screen G13, then moving the tapped position in the direction shown with the arrow F8 to flick or drag. In this case, the gesture input by the user extends into the closed region R18 and another closed region R19. So, the user's input is detected on both closed regions R18 and R19. If the operational event determining routines corresponding to the event associated with each of the closed regions R18 and R19 are run one after the other, occupancy of the CPU 11 is increased and makes it difficult to realize the efficient process. According to the present preferred embodiment, when the user inputs the gesture extends into the multiple closed regions as described above, the event determining part 33 only runs the operational event determining routine corresponding to the event associated with the group of the closed region where the user's input is detected at first, then specifying the event corresponding to the user's input.

To be more specific, the CPU 11 sets the operational event determining routine corresponding to one or more event associated with the closed region where the user's input is detected at first in step S8 of the flow diagram shown in FIG. 8. In the loop processing (steps S9, S10 and S111), the one or more operational event determining routine corresponding to the one or more event associated with the closed region where the input is detected at first is run one after the other, and the event corresponding to the user's input is specified. More in detail, in this loop processing (steps S9, S10 and S11), the event associated with the closed region where the input is not detected at first is excluded from the target of determination even when the user inputs the gesture extends into the multiple closed regions. This prevents running all of the plurality of operational event determining routines 13b to 13h. Thus, the efficient process may be realized, and it allows a decrease in the occupancy in the CPU 11.

The image processing device 1 of the present preferred embodiment 1 as described above includes the grouping part 31, the event determining part 33 and the control executing part 34. The grouping part 31 classifies the multiple screen parts contained in the screen displayed on the display unit 5 into at least one group by the screen parts that are capable of receiving the same event to form the closed regions, and associates the event that can be commonly received by the group with each group. After the user's input is detected on the screen, the event determining part 33 identifies the closed region where the input is detected among from at least one closed region classified by the grouping part 31, and runs only the operational event determining routine corresponding to the event associated with the group of the identified closed region of the plurality of operational event determining routines. The event determining part 33 then specifies the event corresponding to the user's input. The control executing part 34 controls operations based on the event specified by the event determining part 33. The image processing device 1 having the above-described configuration is not necessary to run all of the prepared plurality of operational event determining routines 13b to 13h one after the other even when detecting the user's input on the screen, and is allowed to run only the necessary operational event determining routine in response to the region in the screen on which the user's input is detected. Thus, the load on the CPU 11 may be reduced and the event corresponding to the user's input is allowed to be identified efficiently. As a result, the problem of lowered job execution efficiency on the image processing device 1 may be solved, and the productivity of the image processing device 1 may be improved.

As described above, when the user's input on the screen is detected, all the plurality of the operational event determining routines are not run one after the other and only the necessary operational event determining routine is run in response to the region where the input is detected. Thus, the event corresponding to the user's input may be specified efficiently.

(Modifications)

While the preferred embodiment of the present invention has been described above, the present invention is not limited to the preferred embodiment. Various modifications may be applied to the present invention.

The image processing device 1 of the above-described present preferred embodiment is shown to be one of MFPs, for example. The image processing device 1 is not necessarily the device such as the MFPs. The image processing device 1 may be one of single purpose devices such as printers, fax machines, copiers and scanners. Also, the image processing device 1 is not necessary to be a device executing aforementioned jobs, and may be one of the portable terminals.

The multiple inputs such as flicking, dragging, single tapping, double tapping, long tapping, pinching and rotation are stated as the aforementioned gestures that could be input by the user on the screen. The gestures other than the multiple gestures may be included, and any of the aforementioned gestures may not be included.

What is claimed is:

1. An image processing device comprising:
   a display part on which various types of screens are displayed;
   a manipulation detecting part for detecting an input by a user on the screen of said display part;
   a grouping part for classifying multiple screen parts contained in the screen displayed on said display part into a group as a closed region by the screen part that is capable of receiving the same event and associating the same event with said group as the common event in said group;
   an event determining part for identifying the closed region where the user's input is detected among from at least one closed region classified by said grouping part and running only an operational event determining routine corresponding to the event associated with the group of the identified closed region of a plurality of operational event determining routines when the input is detected by said manipulation detecting part, thereby specifying the event corresponding to the user's input; and
   a controlling part for controlling operations based on the event specified by said event determining part.

2. The image processing device according to claim 1, wherein
   said grouping part classifies the multiple screen parts contained in the screen into at least one group and associates the common event in the group with each group based on instruction information received from outside.

3. The image processing device according to claim 1, wherein
   said grouping part analyzes the multiple screen parts contained in the screen displayed on said display part, thereby classifying two or more screen parts which are capable of receiving the same event and located within the range of a predetermined distance in the screen together to create a group and associating the common event with the group.

4. The image processing device according to claim 1, wherein
   said grouping part selects the common event that can be received on every screen part included in each group among from the multiple events including flicking, dragging, single tapping, double tapping, long tapping and pinching, and associates the selected event.

5. The image processing device according to claim 1, wherein
   the screen parts include an icon image corresponding to an operational key, a list region in which information is displayed in a list form, a thumbnail image region in which a thumbnail image is displayed or a preview region in which a preview image is displayed.

6. The image processing device according to claim 1, wherein
said grouping part is capable of forming another closed region included in one closed region and classifying into two regions, said grouping part associating the common event in both said one closed region and said another closed region with the group corresponding to said one closed region and associating the common event in only said another closed region with the group corresponding to said another closed region.

7. The image processing device according to claim 6, wherein
said event determining part, when the closed region where said manipulation detecting part detects the user's input is said another closed region, runs the operational event determining routines corresponding to the events associated with the group of each of said another closed region and said one closed region one after the other, thereby specifying the event corresponding to the user's input.

8. The image processing device according to claim 7, wherein
said event determining part, when the closed region where said manipulation detecting part detects the user's input is said another closed region, runs the operational event determining routine corresponding to the event associated with said one closed region after running the operational event determining routine corresponding to the event associated with said another closed region.

9. The image processing device according to claim 1, wherein
the screen part contained in the screen displayed on said display part is allowed to be added, deleted or changed, and
said grouping part changes the common event associated with the group including the added, deleted or changed screen part contained in the screen displayed on said display part.

10. The image processing device according to claim 1, wherein
the screen part contained in the screen displayed on said display part is allowed to be added, deleted or changed, and
said grouping part classifies again the multiple screen parts contained in the screen into at least one group when the screen part contained in the screen displayed on said display part is added, deleted or changed.

11. The image processing device according to claim 1, wherein
said grouping part associates the event depending on how the screen part is displayed with the group including the screen part capable of displaying the same information in a different manner.

12. The image processing device according to claim 1, wherein
said event determining part, when the closed region where said manipulation detecting part detects the user's input extends into several closed regions, runs only the operational event determining routine corresponding to the event associated with the group of the closed region where the input is detected at first, thereby specifying the event corresponding to the user's input.

13. A non-transitory computer readable recording medium on which a program is recorded, said program executable on a computer including a display part on which various types of screens are displayed and a manipulation detecting part for detecting an input by a user on the screen of said display part, said program executed on said computer to function as a system comprising:
a grouping part for classifying multiple screen parts contained in the screen displayed on said display part into a group as a closed region by the screen part that is capable of receiving the same event and associating the same event with said group as the common event in said group;
an event determining part for identifying the closed region where the user's input is detected among from at least one closed region classified by said grouping part and running only an operational event determining routine corresponding to the event associated with the group of the identified closed region of a plurality of operational event determining routines when the input is detected by said manipulation detecting part, thereby specifying the event corresponding to the user's input; and
a controlling part for controlling operations based on the event specified by said event determining part.

14. An operational event determining method for determining an event corresponding to an input by a user with a display part on which various types of screens are displayed based on the input, comprising the steps of:
(a) classifying multiple screen parts contained in the screen displayed on said display part into a group as a closed region by the screen part that is capable of receiving the same event and associating the same event with said group as the common event in said group;
(b) detecting the input by the user with one of the screens being displayed on said display part; and
(c) identifying the closed region where the user's input is detected among from at least one closed region classified by said grouping part and running only an operational event determining routine corresponding to the event associated with the group of the identified closed region of the plurality of operational event determining routines when the input is detected by said manipulation detecting part, thereby specifying the event corresponding to the user's input.

\* \* \* \* \*